(12) United States Patent
Aizawa

(10) Patent No.: US 7,330,700 B2
(45) Date of Patent: Feb. 12, 2008

(54) RADIO APPARATUS AND METHOD FOR DETERMINING THE COMMUNICATION TIMING OF A CHANNEL QUALITY INDICATOR (CQI) BASED ON CQI UPDATE AND CQI REPETITION COUNT INFORMATION

(75) Inventor: Junichi Aizawa, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 182 days.

(21) Appl. No.: 10/542,771

(22) PCT Filed: Jul. 29, 2004

(86) PCT No.: PCT/JP2004/011213

§ 371 (c)(1),
(2), (4) Date: Jul. 20, 2005

(87) PCT Pub. No.: WO2005/013512

PCT Pub. Date: Feb. 10, 2005

(65) Prior Publication Data

US 2006/0072510 A1    Apr. 6, 2006

(30) Foreign Application Priority Data

Jul. 31, 2003    (JP) .............................. 2003-284512

(51) Int. Cl.
*H04B 17/00*    (2006.01)

(52) U.S. Cl. ................................ 455/67.13; 455/115.4; 455/277.2; 455/504; 370/332; 370/350

(58) Field of Classification Search ............. 455/115.3, 455/424, 425, 412.2, 412.1, 456.5, 67.7, 455/550.1, 575.1, 456.6, 561, 436, 450, 452.2, 455/515, 151.1, 456.2, 432.1, 63.1, 504, 455/506, 67.11, 502, 509, 512, 510, 501, 455/67.13, 126, 166.2, 154.1, 296, 24, 522, 455/517, 114.2; 370/332, 353, 506, 311, 370/431, 335, 349, 347, 253, 350; 375/144, 375/149, 220, 229, 325, 346, 363, 368, 357, 375/354

See application file for complete search history.

(56) References Cited

U.S. PATENT DOCUMENTS 5,603,093 A * 2/1997 Yoshimi et al. ............ 455/63.1

(Continued)

FOREIGN PATENT DOCUMENTS

JP    2000151623    5/2000

(Continued)

OTHER PUBLICATIONS

PCT International Search Report dated Dec. 7, 2004.

(Continued)

*Primary Examiner*—Edward F. Urban
*Assistant Examiner*—Charles Chow
(74) *Attorney, Agent, or Firm*—Stevens, Davis, Miller & Mosher, LLP

(57) ABSTRACT

When a CQI that is based on CQI update cycle information and a CQI that is based on repetition count information have an overlapping transmission timing, CQI transmission timing controller 110 and CQI transmission timing priority determiner 120 transmit the CQI that is based on the CQI repetition count with priority. As a result, the receiving side is able to secure the combining count of the CQI and prevent deterioration in CQI error rate characteristics.

18 Claims, 17 Drawing Sheets

U.S. PATENT DOCUMENTS

| | | | |
|---|---|---|---|
| 6,775,547 B2 * | 8/2004 | Zimmerman et al. | 455/450 |
| 6,985,453 B2 * | 1/2006 | Lundby et al. | 370/311 |
| 7,089,015 B2 * | 8/2006 | Fukui | 455/450 |
| 2003/0100267 A1 | 5/2003 | Itoh et al. | |
| 2004/0022213 A1 * | 2/2004 | Choi et al. | 370/332 |
| 2004/0032853 A1 * | 2/2004 | D'Amico et al. | 370/349 |
| 2004/0142698 A1 * | 7/2004 | Pietraski | 455/452.2 |
| 2004/0176040 A1 * | 9/2004 | Thornton et al. | 455/67.11 |
| 2005/0191965 A1 * | 9/2005 | Yu et al. | 455/67.16 |
| 2005/0243793 A1 * | 11/2005 | Kim et al. | 370/347 |
| 2005/0255807 A1 * | 11/2005 | Araki et al. | 455/23 |
| 2006/0133402 A1 * | 6/2006 | Dottling et al. | 370/431 |
| 2006/0285558 A1 * | 12/2006 | Dottling et al. | 370/506 |
| 2007/0026803 A1 * | 2/2007 | Malm | 455/63.1 |
| 2007/0047502 A1 * | 3/2007 | Marinier et al. | 370/335 |

FOREIGN PATENT DOCUMENTS

| | | |
|---|---|---|
| WO | 0241530 | 5/2002 |

OTHER PUBLICATIONS

3GPP TS 25.214 V5.8.0 (Mar. 2004), pp. 37-43.

* cited by examiner

RADIO APPARATUS AND METHOD FOR DETERMINING THE COMMUNICATION TIMING OF A CHANNEL QUALITY INDICATOR (CQI) BASED ON CQI UPDATE AND CQI REPETITION COUNT INFORMATION

TECHNICAL FIELD

The present invention relates to a radio transmission apparatus, radio receiving apparatus, radio communication system, radio transmission method, and radio reception method. More particularly, the present invention relates to technologies that are applicable to radio communication systems where transmission rate is adaptively controlled using the CQI (Channel Quality Indicator).

BACKGROUND ART

Heretofore, in the field of radio communication system, HSDPA has been standardized whereby a plurality of communication terminals share a high-speed, high-capacity downlink channel and perform high-speed packet transmission in the downlink (i.e. High Speed Downlink Packet Access) (see, for example, Laid-Open Japanese Patent Application Publication No.2000-151623)

In the HSDPA system, the communication terminal transmits the signal called CQI (Channel Quality Indicator) representing the modulation method and spreading factor for packet data that allow demodulation in the communication terminal, in a cycle set by higher apparatus such as RNC (Radio Network Controller). The base station receives the CQI, and, based on the CQIs from individual communication terminals, performs scheduling and selects the optimal modulation method, spreading factor, and others. Then, the base station modulates and encodes transmit data in accordance with the modulation method and spreading factor that are selected, and, based on the scheduling result, transmits data to the individual communication terminals. By this means, it is possible to adaptively change the transmission rate depending on the signal propagation environment and transmit great amount of data from the base station to the communication terminal.

As to the method of transmitting the CQI, there is a method standardized in 3GPP, TS 25.214 V5.5.0 6A.1.2. According to this method, the communication terminal calculates the CQI on a regular basis based on the parameter called "feedback cycle k" and transmits the calculated CQI to the base station. In addition, the communication terminal repeats transmitting the CQI to the base station for the number of times determined based on the parameter called "N_CQI_transmit".

FIG. 1 shows a configuration of a conventional communication terminal that transmits the CQI. In communication terminal 10, radio receiver 13 receives a radio signal that is transmitted from a radio base station, via antenna 11 and antenna duplexer 12, performs predetermined radio processing, and thereafter transmits the result to despreader 14. Despreader 14 performs despreading processing on the signal inputted from radio receiver 13, and sends the signal after the despreading processing to demodulator 15 and SIR measurer 17. Demodulator 15 performs demodulation processing on the signal inputted from despreader 14 and sends the signal after the demodulation to decoder 16. Decoder 16 performs decoding processing on the signal after the demodulation and obtains the received data. In addition, SIR measurer 17 measures the SIR (Signal to Interference Ratio) of the signal inputted from despreader 14, and sends the measured SIR to CQI calculator 18. Based on the measured SIR, CQI calculator 18 determines downlink transmission rate information (i.e. CQI) that allows reception in communication terminal 10 and sends the result to transmit frame generator 19.

Based on CQI update cycle information and CQI repetition count information stored in memory 24, CQI transmission timing controller 20 selects the CQI to transmit and the transmission timing of the CQI. In practice, CQI transmission timing controller 20 changes content of the CQI in a cycle in accordance with the parameter feedback cycle k (i.e. CQI update cycle information), which is stored in memory 24, and sends a control signal, which commands to transmit the same CQI for the number of times in accordance with the parameter repetition (i.e. CQI repetition count information), which is stored in memory 24, to transmit frame generator 19. Incidentally, the CQI update cycle information and CQI repetition count information stored in memory 24 are configured by higher apparatus such as RNC, and are received via the radio base station.

FIG. 2 shows CQI transmission timings in the communication terminal where feedback cycle k is 3 (meaning that the CQI is calculated once every three sub-frames, and that the CQI is changed every three sub-frames and transmitted to the radio base station) and repetition is 2 (meaning that the same CQI is transmitted twice in consecutive sub-frames).

In the periods in which the CQI is calculated (i.e. measurement reference periods), the communication terminal measures CQI 1 (FIG. 2(a)) in measurement period Ref 1, which corresponds to sub-frame (SF) #0, and repeats transmitting CQI 1 in SF #1 and SF #2 in HS-DPCCH (High Speed-Dedicated Physical Control Channel) sub-frames' (FIG. 2(b)). Likewise, the communication terminal measures CQI2 in measurement period Ref 2, which corresponds to SF #3, and repeats transmitting CQI 2 in SF #4 and SF #5. Incidentally, SF #0-SF #5 are formed with three slots each, designed such that the ACK/NACK signal is embedded in the first one slot and the CQI signal is embedded in the other two slots.

Transmit frame generator 19 generates a transmit frame from transmit data and the CQI signal and sends the result to modulator 21. In practice, as mentioned above, in accordance with the control signal from CQI transmission timing controller 20, transmit frame generator 19 determines the position in the transmit frame where the CQI signal is embedded, and determines whether to embed the same CQI signal or embed a new, changed CQI signal, and generates the transmit frame.

Modulator 21 modulates the transmit frame inputted from transmit frame generator 19 and sends the result to spreader 22. Spreader 22 spreads the signal after the modulation and sends the result to radio transmitter 23. Radio transmitter 23 performs predetermined radio processing on the signal after the spreading and transmits the result to the radio base station via antenna duplexer 12 and antenna 11.

FIG. 3 shows a configuration of a conventional radio base station that receives the CQI signal from communication terminal 10 and transmits downlink signals based on the received CQI. In radio base station 30, radio receiver 33 receives a radio signal that is transmitted from communication terminal 10 via antenna 31 and antenna duplexer 32, performs predetermined radio processing, and thereafter sends the result to despreader 34.

Memory 44 stores the same CQI update cycle information and CQI repetition count information as those stored in memory 24 in communication terminal 10. Consequently, CQI reception timing controller 35 determines the timing to receive the CQI from the same CQI update cycle information and CQI repetition count information as those used in communication terminal 10, and sends reception timing information to despreader 34. CQI reception timing controller 35 determines the number of times the CQI is combined from the same CQI update cycle information and CQI repetition count information as those used in communication terminal 10, and sends combining count information to buffer 37 and decoder 38.

FIG. 4 shows CQI reception timings in radio base station 30, with the same parameters as in communication terminal 10—that is, CQI feedback cycle k is 3 and repetition is 2. In this case, sub-frame (SF) #1 and SF #2 have a timing to receive CQI 1 and SF #4 and SF #5 have a timing to receive CQI 2. CQI 1 and CQI 2 are each combined twice.

Despreader 34 despreads the signal inputted from radio receiver 33 in accordance with the CQI reception timing indicated by CQI reception timing controller 35. Demodulator 36 demodulates the signal inputted from despreader 34 and sends the demodulation result to buffer 37. Of the signals inputted from demodulator 36, buffer 37 keeps the CQI signal and sends the rest of the signals to decoder 38.

Buffer 37 holds the CQIs in an equivalent number as the CQI combining count indicated by CQI reception timing controller 35, sends the CQI signals held to decoder 38, and thereafter erases the content of buffer 37. In FIG. 4, when the number of the CQI signals held reaches two, buffer 37 outputs these CQI signals to decoder 38 and erases the content of buffer 37.

Decoder 38 decodes the signal after the demodulation inputted from buffer 37, and obtains the received data. In addition, decoder 38 combines and decodes the CQI signals inputted from buffer 37 in accordance with the CQI combining count indicated by CQI reception timing controller 35, and sends the decoded CQI to scheduler 39. The CQI signals are decoded by the CQI combining count, meaning that all the CQI signals outputted from buffer 37 equal to the combining count in number, are combined and decoded. In FIG. 4, the two CQI signals held in buffer 37 are combined decoded to obtain one decoding result.

Scheduler 39 determines the transmission rate of the transmit data based on the CQI inputted from decoder 38 and sends the result to transmit frame generator 40. Transmit frame generator 40 generates a transmit frame based on the transmission rate reported from scheduler 39, and sends the result to modulator 41. Modulator 41 performs modulation processing on the signal inputted from transmit frame generator 40 and sends the modulated signal to spreader 42. Incidentally, the modulation method in modulator 41 can be changed depending on the transmission rates. Spreader 42 performs spread modulation on the signal after the modulation and sends the spreading result to radio transmitter 43. Radio transmitter 43 performs predetermined radio processing on the signal after the spread-modulation and transmits the result to communication terminal 10 via antenna duplexer 32 and antenna 31.

However, as mentioned above, in a system where the CQI update cycle and CQI repetition count are designated, problems might occur depending on the combinations of the CQI update cycle and CQI repetition count. FIG. 5 illustrates an example of such problem. FIG. 5 shows CQI transmission timings in the communication terminal, where CQI feedback cycle k is 2 (meaning that the CQI is calculated once every two sub-frames and the CQI is changed every two sub-frames and sent to the radio base station), and repetition is 3 (meaning that the same CQI is transmitted three times in consecutive sub-frames).

In the periods in which the CQI is calculated, the communication terminal measures CQI 1 in measurement period Ref 1, which corresponds to sub-frame (SF) #0, and repeats transmitting CQI 1 in SF #1, SF #2, and SF #3 in HS-DPCCH sub-frames. In addition, CQI 2 is measured in measurement period Ref 2, which corresponds to SF #2, and transmitted in SF #3, SF #4, and SF #5.

As a result, a transmission timing of CQI 1 and a transmission timing of CQI 2 overlap in SF#3. Moreover, it is not clear whether CQI 2 is transmitted in SF #4. Likewise, a transmission timing of CQI 2 and a transmission timing of CQI 3 overlap in SF #5, and a transmission timing of CQI 3 and a transmission timing of CQI 4 overlap in SF #7.

This creates the problem that the communication terminal becomes unable to determine which CQI to transmit in the sub-frames where transmission timings overlap. If the communication terminal blindly selects one of the CQIs and transmits it, this might result in a case where the received power of the CQI obtained in the base station apparatus by means of combining, is insufficient and the CQI is restored erroneously. If the error rate of the CQI increases, error rate characteristics in the downlink will also deteriorate, and, consequently, the amount of traffic in the downlink decreases.

SUMMARY OF THE INVENTION

It is therefore an object of the present invention to provide a radio transmission apparatus, radio receiving apparatus, radio communication system, radio transmission method and radio reception method, that can prevent deterioration in CQI error rate characteristics even when CQI update cycle information and CQI repetition count information are configured such that a transmission/reception timing of a CQI that is based on the CQI update cycle information and a transmission/reception timing of a CQI that is based on the CQI repetition count information overlap.

The above object can be achieved thus: At the transmitting side, when a transmission timing of a CQI that is based on predetermined CQI update cycle information and a transmission timing of a CQI that is based on predetermined CQI repetition count information overlap, the CQI that is based on repetition count information is transmitted with priority. In addition, the above object can be achieved thus: At the receiving side, when a transmission timing of a CQI that is based on predetermined CQI update cycle information and a reception timing of a CQI that is based on predetermined CQI repetition count information overlap, the CQI that is based on repetition count information is subjected to reception and decoding processing with priority.

By this means, the CQI combined at the receiving side reliably secures sufficient received power and the error rate characteristics of the CQI thus improve.

MODES FOR CARRYING OUT THE INVENTION

Now, embodiments of the present invention will be described in detail with reference to the accompanying drawings.

EMBODIMENT 1

Figure 1:
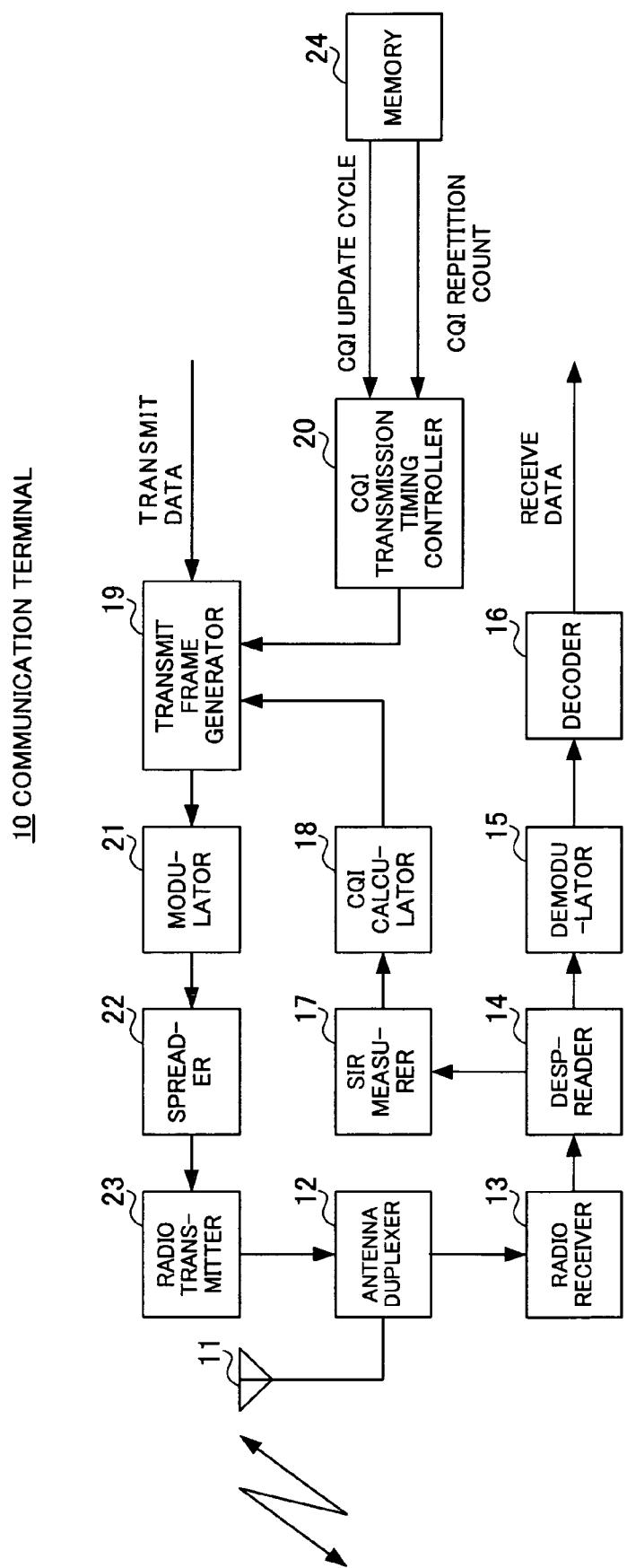
FIG. 1 is a block diagram showing a configuration of a conventional communication terminal.
Figure 2:
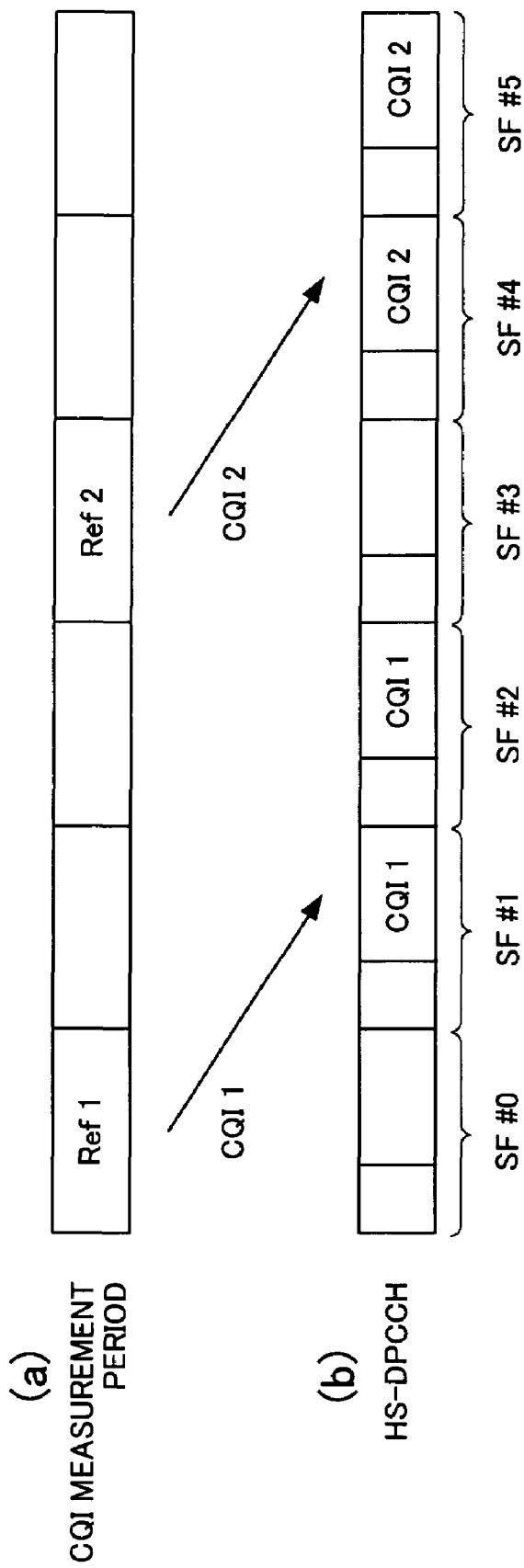
FIG. 2 explains CQI transmission timings.
Figure 3:
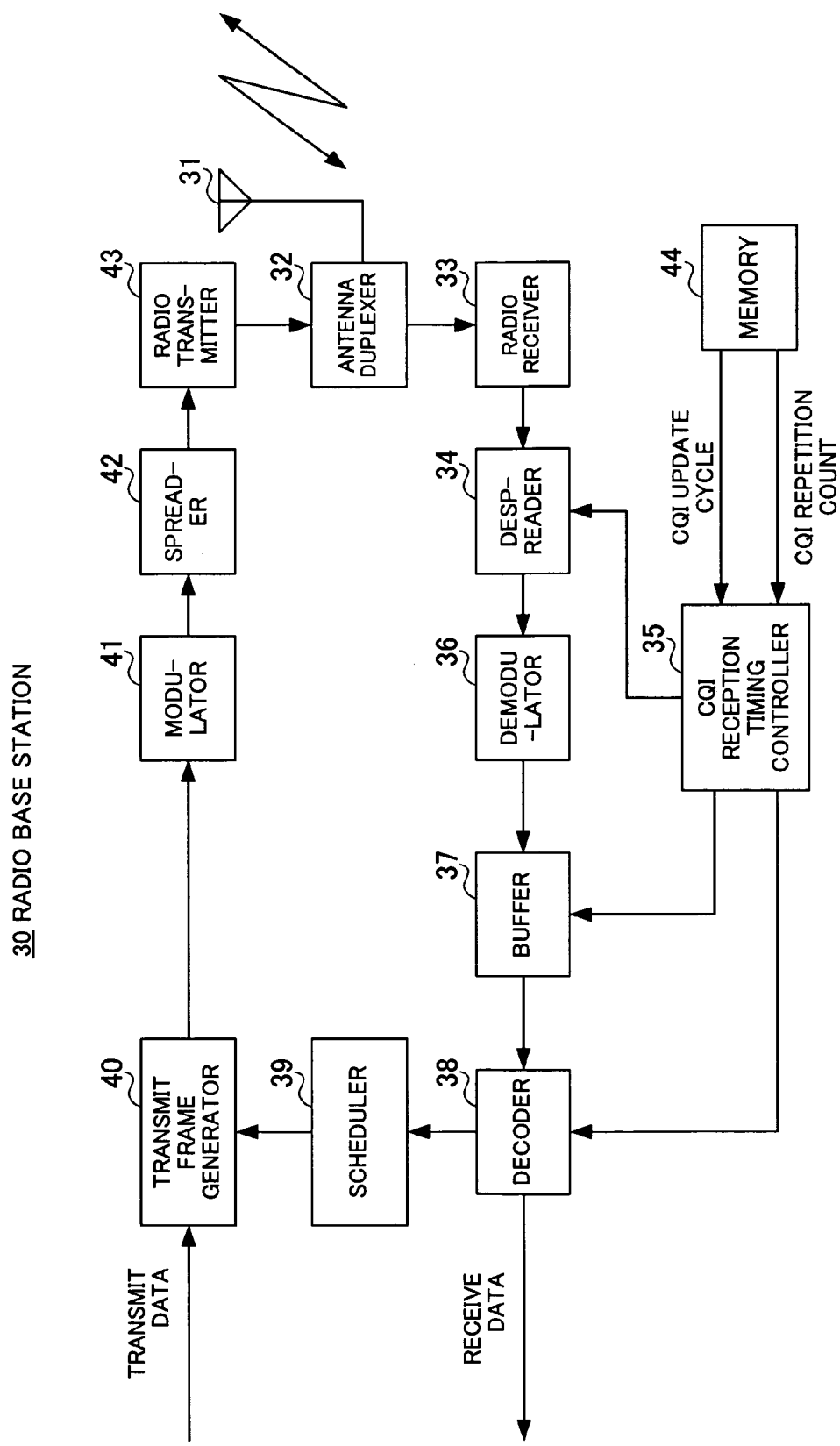
FIG. 3 is a block diagram showing a configuration of a conventional radio base station.
Figure 4:
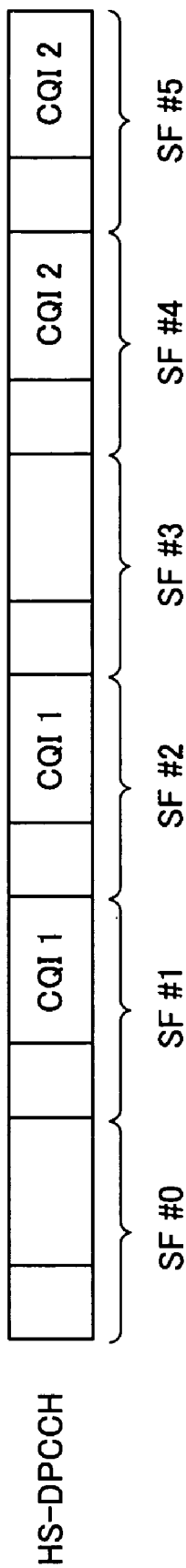
FIG. 4 explains CQI reception timings.
Figure 5:
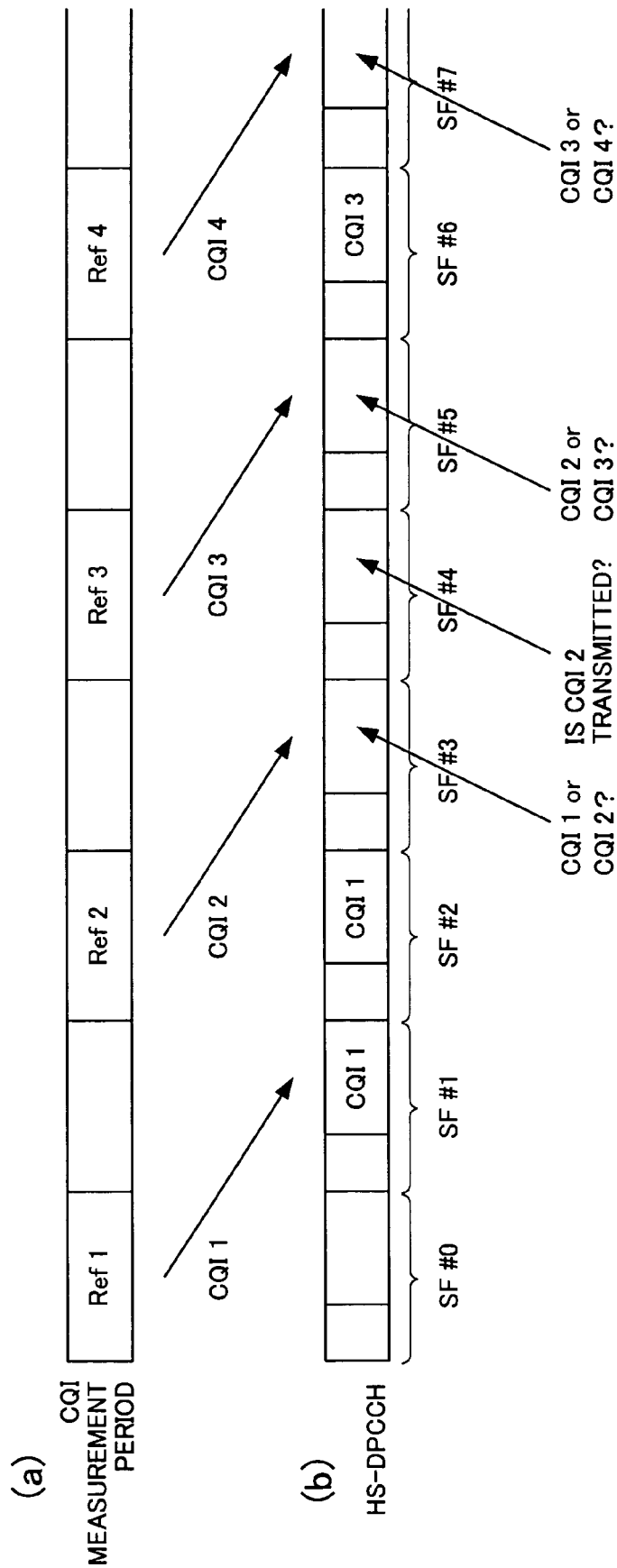
FIG. 5 illustrates a case where a transmission timing of a CQI that is based on CQI update cycle information and a transmission timing of a CQI that is based on CQI repetition count information overlap.
Figure 6:
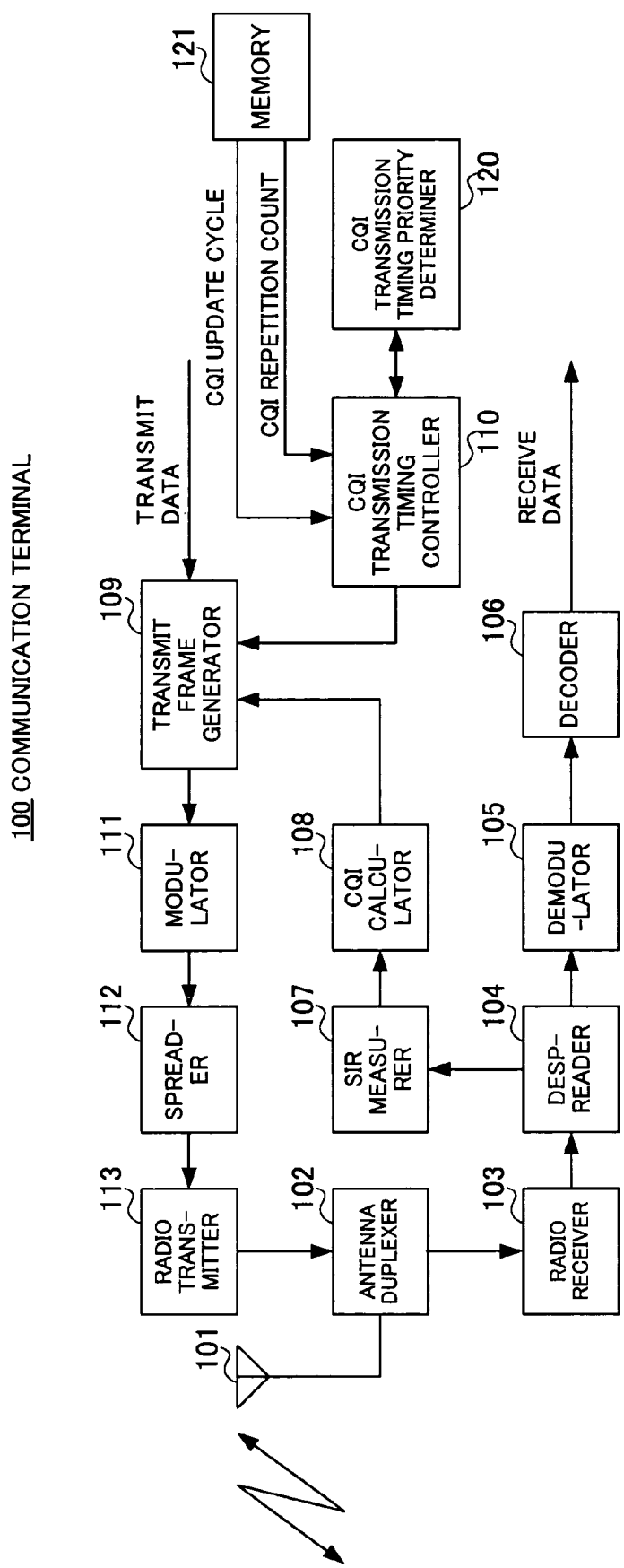
FIG. 6 is a block diagram showing a configuration of a communication terminal according to Embodiment 1 of the present invention.

FIG. 6 shows the configuration of a communication terminal in accordance with Embodiment 1 of the present invention. In communication terminal 100, radio receiver 103 receives a radio signal that is transmitted from a radio base station via antenna 101 and antenna duplexer 102, performs predetermined radio processing, and thereafter sends the result to despreader 104. Despreader 104 performs despreading processing on the signal inputted from radio receiver 103 and sends the signal after the despreading processing to demodulator 105 and SIR measurer 107. Demodulator 105 performs demodulation processing on the signal inputted from despreader 104 and sends the signal after the demodulation to decoder 106. Decoder 106 performs decoding processing on the signal after the demodulation and obtains the received data. In addition, SIR measurer 107 measures the SIR of the signal inputted from despreader 104 and sends the measured SIR to CQI calculator 108. Based on the measured SIR, CQI calculator 108 determines downlink transmission rate information (i.e. CQI) that enables reception in communication terminal 100, and sends the result to transmit frame generator 108.

Based on CQI update cycle information and CQI repetition count information stored in memory 121, CQI transmission timing controller 110 selects the transmission timing of the CQI and the CQI to transmit. In practice, CQI transmission timing controller 110 changes content of the CQI in a cycle in accordance with feedback cycle k (i.e. CQI update cycle information), which is a parameter stored in memory 121, and sends a control signal, which commands to transmit the same CQI for the number of times in accordance with the parameter repetition (i.e. CQI repetition count information), which is stored in memory 121, to transmit frame generator 109. Incidentally, the CQI update cycle information and CQI repetition count information stored in memory 121 are configured by higher apparatus such as RNC and received via the radio base station.

In addition to the above-described configuration, this communication terminal 100 of the present embodiment has CQI transmission timing priority determiner 120. Now, when a transmission timing of a CQI that is based on the CQI update cycle information and a transmission timing of a CQI that is based on the CQI repetition count information overlap, CQI transmission timing controller 110 reports this overlap of transmission timings to CQI transmission timing priority determiner 120. Upon receiving information indicating the overlap of transmission timings, CQI transmission timing priority determiner 120 gives a command to transmit the CQI based on repetition with priority, to CQI transmission timing controller 110. CQI transmission timing controller 110 follows the command from CQI transmission timing priority determiner 120 and gives the timing to transmit the CQI and a command to transmit the CQI based on repetition with priority, to transmit frame generator 109.

Transmit frame generator 109 generates a transmit frame from transmit data and the CQI signal, and sends the result to modulator 111. In practice, as mentioned above, in accordance with the control signal from CQI transmission timing controller 110, transmit frame generator 109 determines the position in the transmit frame where the CQI signal is embedded, and determines whether to embed the same CQI signal or embed a new, changed CQI signal, and generates the transmit frame.

Thus, when a transmission timing of the CQI that is based on the CQI update cycle information and a transmission timing of the CQI that is based on the CQI repetition count information overlap, CQI transmission timing controller 110, CQI transmission timing priority determiner 120, and transmit frame generator 109 operate as a CQI transmission unit that transmits the CQI based on the CQI repetition count information with priority.

Modulator 111 modulates the transmit frame inputted from transmit frame generator 109 and sends the signal after the modulation to spreader 112. Spreader 112 spreads the signal after the modulation and sends the signal after the despreading to radio transmitter 113. Radio transmitter 113 performs predetermined radio processing on the signal after the spreading and transmits the signal after the radio processing to the radio base station via antenna duplexer 102 and antenna 101.

Figure 7:
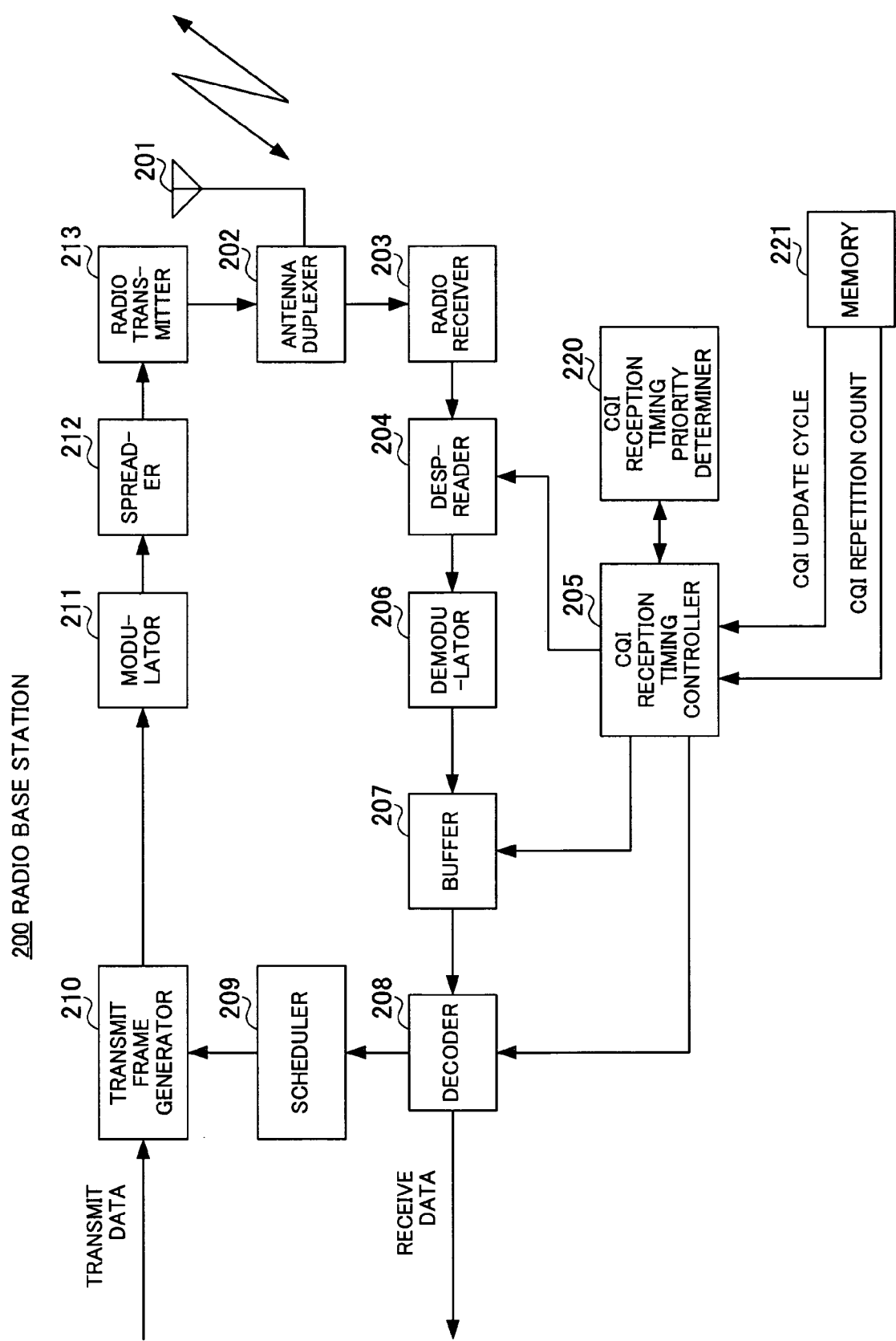
FIG. 7 is a block diagram showing a configuration of a radio base station according to Embodiment 1.

FIG. 7 shows the configuration of the radio base station that receives the CQI signal from communication terminal 100 and transmits downlink signals based on the received CQI. In radio base station 200, radio receiver 203 receives a radio signal transmitted from communication terminal 100 via antenna 201 and antenna duplexer 202, performs predetermined radio processing, and thereafter sends the result to despreader 204.

Memory 221 stores the same CQI update cycle information and CQI repetition count information as those stored in memory 121 of communication terminal 100. Consequently, CQI reception timing controller 205 determines the timing to receive the CQI from the same CQI update cycle information and CQI repetition count information as the ones utilized in communication terminal 100, and sends CQI reception timing information to despreader 204. CQI reception timing controller 205 determines the number of times the CQI is combined from the same CQI update cycle information and CQI repetition count information as those utilized in communication terminal 100, and sends combining count information to buffer 207 and decoder 208.

In addition to the above-noted configuration, this radio base station 200 of the present embodiment has CQI reception timing priority determiner 220. Now, when a reception timing of a CQI that is based on the CQI update cycle information stored in memory 221 and a reception timing of a CQI that is based on the CQI repetition count information stored in memory 221 overlap, CQI reception timing controller 205 reports this overlap of reception timings to CQI reception timing priority determiner 220. Upon receiving information indicating the overlap of reception timings, CQI reception timing priority determiner 220 gives a command to receive the CQI based on repetition with priority, to CQI reception timing controller 205. In accordance with the command from CQI reception timing priority determiner 220, CQI reception timing controller 205 determines the timing to receive the CQI and sends reception timing information to despreader 204. In addition, in accordance with the command from CQI reception timing priority determiner 220, CQI reception timing controller 205 determines the number of times the CQI is combined, and sends this combining count to buffer 207 and decoder 208.

In accordance with the CQI reception timing indicated by CQI reception timing controller 205, despreader 204 despreads the signal inputted from radio receiver 203 and sends the signal after the despreading to demodulator 206. Demodulator 206 demodulates the signal inputted from despreader 204 and sends the signal after the demodulation to buffer 207. Of all signals inputted from demodulator 206, buffer 207 keeps the CQI signals and sends the rest of the signals to decoder 208.

In addition, buffer 207 holds the CQIs in an equivalent number to the CQI combining count indicated by CQI reception timing controller 205, sends the CQI signals held to decoder 208, and thereafter erases the content of buffer 207.

Decoder 208 decodes the signals after the demodulation, inputted from buffer 207, and obtains the received data. In addition, decoder 208 combines and decodes the CQI signals inputted from buffer 207 in accordance with the CQI combining count indicated by CQI reception timing controller 205, and sends the decoded CQI to scheduler 209.

Thus, when a reception timing of the CQI that is based on the CQI update cycle information and a reception timing of the CQI that is based on the CQI repetition count information overlap, CQI reception timing controller 205, CQI reception timing priority determiner 220, despreader 204, buffer 207 and decoder 208 operate as a CQI reception and decoding unit that receives and decodes the CQI that is based on the CQI repetition count information with priority.

Scheduler 209 determines the transmission rate of the transmit data based on the CQI inputted from decoder 208, and sends transmission rate information to transmit frame generator 210. Transmit frame generator 210 generates a transmit frame based on the transmission rate reported from scheduler 209 and sends the result to modulator 211. Modulator 211 performs modulation processing on the signal inputted from transmit frame generator 210 and sends the signal after the modulation to spreader 212. Incidentally, the modulation method in modulator 211 can be changed depending on the transmission rates. Spreader 212 performs spread modulation on the signal after the modulation and sends the signal after the spreading to radio transmitter 213. Radio transmitter 213 performs predetermined radio processing on the signal after the spread modulation and transmits the signal after the radio processing to communication terminal 100 via antenna duplexer 202 and antenna 201.

Figure 8:
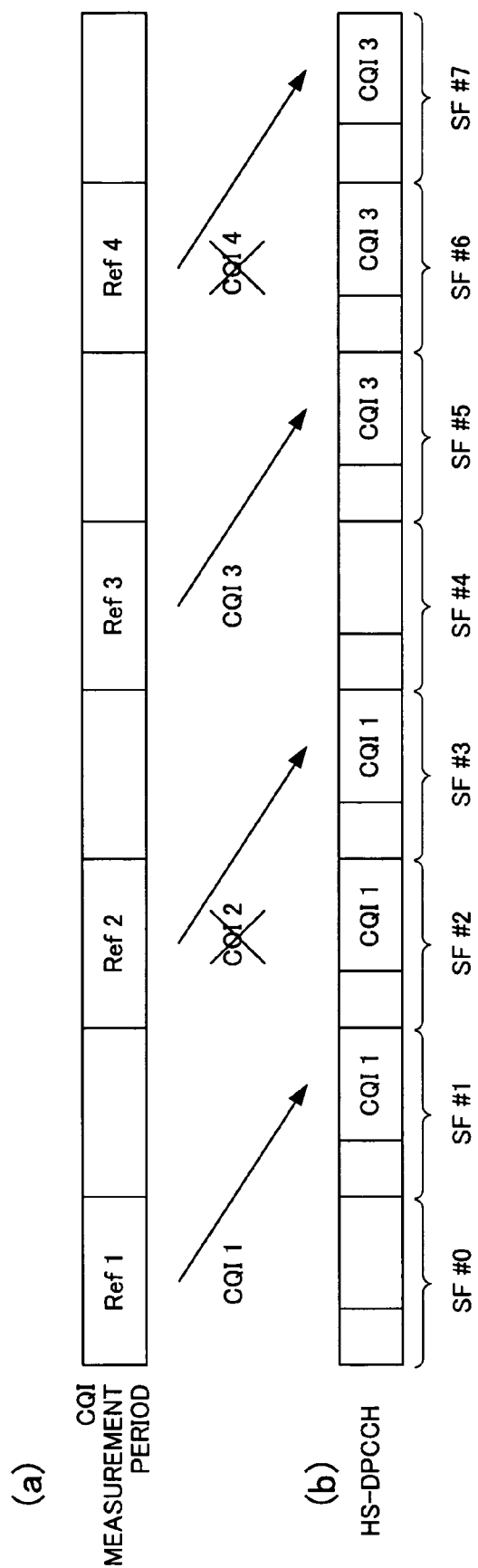
FIG. 8 illustrates CQI transmission timing in the communication terminal of Embodiment 1.

The operation of the present embodiment will be explained next. FIG. 8 illustrates CQI transmission timings in communication terminal 100 of the present embodiment, where CQI feedback cycle k is 2 (meaning that the CQI is calculated once every two sub-frames and that the CQI is changed every two sub-frames and transmitted to the radio base station), and repetition is 3 (meaning that the same CQI is transmitted three times in consecutive sub-frames).

In the periods in which the CQI is calculated, communication terminal 100 measures CQI 1 (FIG. 8(a)) in measurement period Ref 1, which corresponds to sub-frame (SF) #0, and repeats transmitting CQI 1 in SF #1, SF #2, and SF #3 in HS-DPCCH (High Speed-Dedicated Physical Control Channel) sub-frames (FIG. 8(b)). If, for example, these CQIs are arranged simply based on the CQI update cycle information and CQI repetition count information, CQI 2, which is measured in Ref 2 that corresponds to SF #3, will be transmitted in SF #3, SF #4, and SF #5, and a transmission timing of CQI 1 and a transmission timing of CQI 2 will overlap in SF #3. In addition, it becomes unclear whether or not CQI 2 is transmitted in SF #4. Likewise, a transmission timing of CQI 2 and a transmission timing of CQI 3 overlap in SF #5 and a transmission timing of CQI 3 and a transmission timing of CQI 4 overlap in SF #7.

However, communication terminal 100 according to the present embodiment is designed to transmit the CQI based on repetition with priority. Accordingly, CQI 1 is transmitted in SF #3 and CQI 3 is transmitted in SF #5 and SF #7. Moreover, if a CQI is cancelled transmission because a CQI based on repetition is transmitted with priority, the former will not be transmitted at all. In other words, the transmissions of CQI 2 and CQI 4 are stopped.

Thus, the present embodiment is designed to transmit the CQI based on repetition with priority, so that the combined gain of the CQI is reliably secured at the receiving side. As a result, it becomes possible to prevent deterioration in CQI error rate characteristics and minimize the decrease in the amount of transmit data in the downlink.

The situation where a transmission timing of a CQI that is based on CQI update cycle information and a transmission timing of a CQI that is based on repetition count information overlap is likely to occur when the CQI update cycle information is set short and the CQI repetition count information is set large. Making the CQI update cycle short makes possible transmitting good CQIs when the signal propagation environment changes rapidly in short time. Making the CQI repetition count large makes the combined gain of the CQIs large and improves error rate characteristics.

When a transmission timing of a CQI that is based on CQI update cycle information and a transmission timing of a CQI that is based on CQI repetition count information overlap, it is certainly possible to prioritize one over the other. However, the present inventor considered that even if a good CQI is transmitted in a signal propagation environment that changes rapidly in short time, this CQI is more likely to have poor error rate characteristics and decrease the amount of transmit data in the downlink. Consequently, the present embodiment is designed to transmit the CQI based on repetition.

Moreover, if a CQI is cancelled transmission because a CQI based on repetition is transmitted with priority, the former will not be transmitted at all. Consequently, when a CQI is calculated, it is quickly transmitted. It is certainly possible to place CQI 2 in SF #4, SF #5, and SF #6. However, this then places CQI 3 in SF #7, SF #8, and SF #9 and causes a delay from the time the CQI is calculated until the time the CQI is transmitted to the radio base station. The present embodiment is designed such that if a CQI is cancelled transmission because a CQI based on repetition is transmitted with priority, the former will not be transmitted at all. Consequently, the present embodiment makes it possible to eliminate the above-mentioned delay, and, using this CQI, enables the radio base station that performs downlink transmission to perform transmission at adequate transmission rates in accordance with the signal propagation environment.

Figure 9:
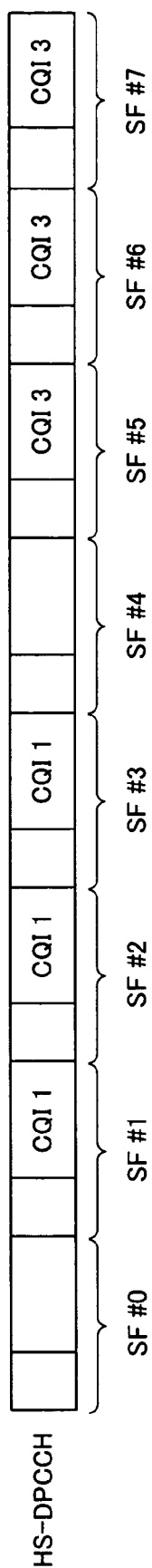
FIG. 9 illustrates CQI reception timings in the radio base station of Embodiment 1.

FIG. 9 illustrates CQI reception timings in radio base station 200 according to the present embodiment where, with the same parameters as in communication terminal 100—that is, CQI feedback cycle k is 2 and repetition is 3.

When radio base station 200 tries to perform CQI reception processing based simply on the CQI update cycle information and repetition count information, a reception timing of CQI 1 and a reception timing of CQI 2 overlap in sub-frame (SF) #3. In addition, in SF #4, it is unclear whether or not CQI 2 is received. Likewise, a reception timing of CQI 2 and a reception timing of CQI 3 overlap in SF #5, and a reception timing of CQI 3 and a reception timing of CQI 4 overlap in SF #7.

However, at these reception timings, radio base station 200 of the present embodiment receives and decodes the CQIs based on repetition with priority, so that it is clear which CQI is received in each sub-frame. As a result, the same CQIs can be reliably combined upon combination in decoder 208.

To be more specific, radio base station 200 sets a reception timing of CQI 1 in SF #1, SF #2, and SF #3, and sets a reception timing of CQI 3 in SF #5, SF #6, and SF #7. Decoder 208 combines the CQI 1's from SF #1, SF #2, and SF #3, and combines the CQI 3's from SF #5, SF #6, and SF #7. Consequently, CQI 1 and CQI 3 are each combined three times. In comparison to the case where the communication terminal and the radio base station both prioritize transmission of the CQI that is based on CQI update cycle information, radio base station 200 combines the CQI three times and decodes the result, so that the CQI has sufficient received power and makes it possible to have a correct and errorless CQI.

FIG's. 10, 11, and 12 show comparative examples in relation to the present embodiment.

Figure 10:
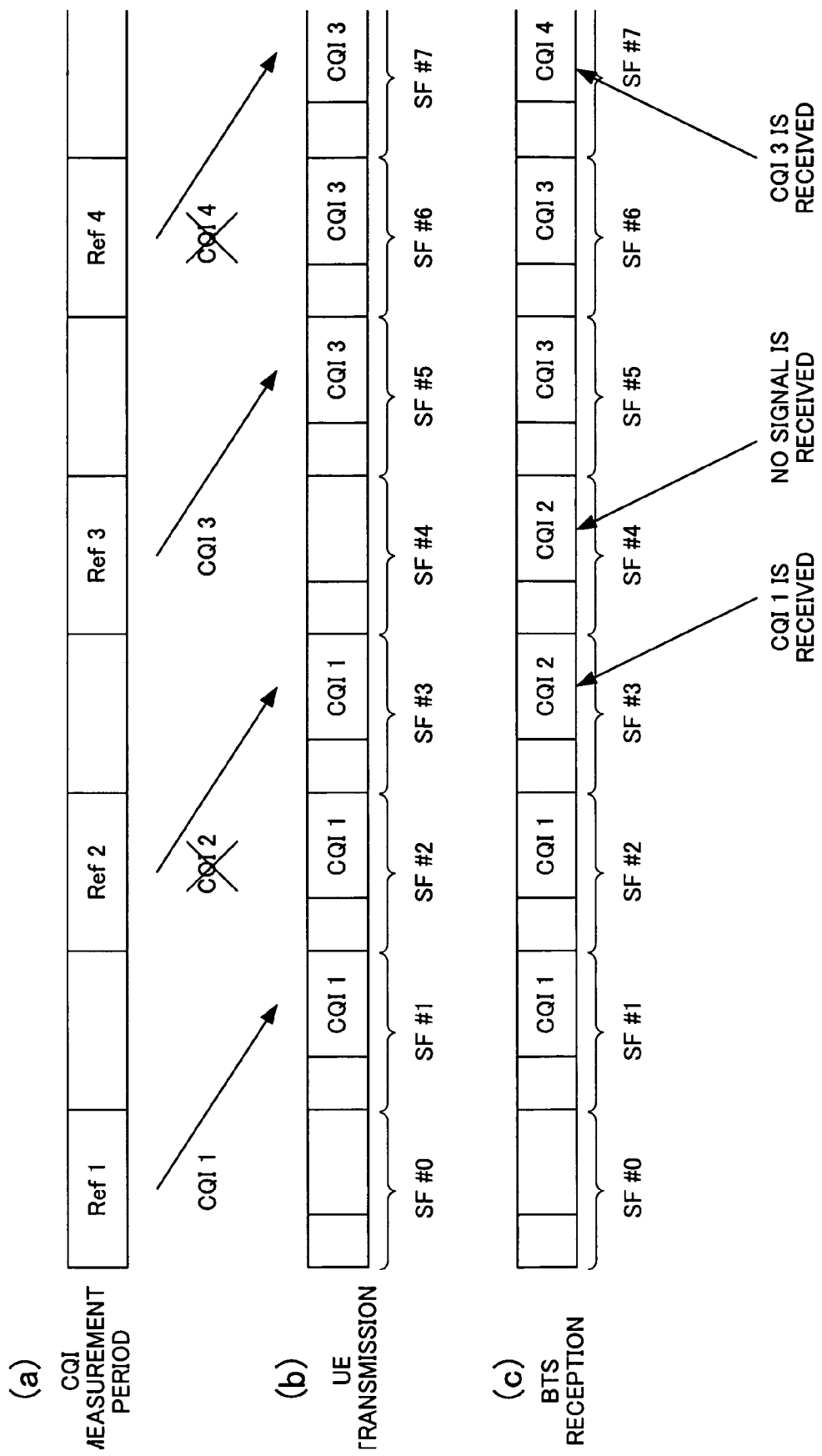
FIG. 10 illustrates transmission and reception timings in a first comparative example in comparison to the embodiment.

FIG. 10 illustrates a first comparative example, where the communication terminal transmits the CQIs that are based on repetition count information with priority ("UE transmission") and the radio base station receives the CQIs that are based on CQI update cycle information with priority ("BTS reception"). In this case, although the communication terminal combines CQI 1's three times and transmits the result with enough transmission power to enable reception and decoding, the radio base station combines CQI 1's twice in sub-frame (SF) #1 and SF #2 and receives and decodes the result. Consequently, the CQI has insufficient received power and the probability the CQI results in an error increases. In addition, although the communication terminal transmits CQI 1 only in SF#3, the radio base station judges that CQI 2 is transmitted twice in SF#3 and SF#4, and combines one CQI 1 and nothing twice and receives and decodes the result. Consequently, the probability the CQI results in an error increases further.

Figure 11:
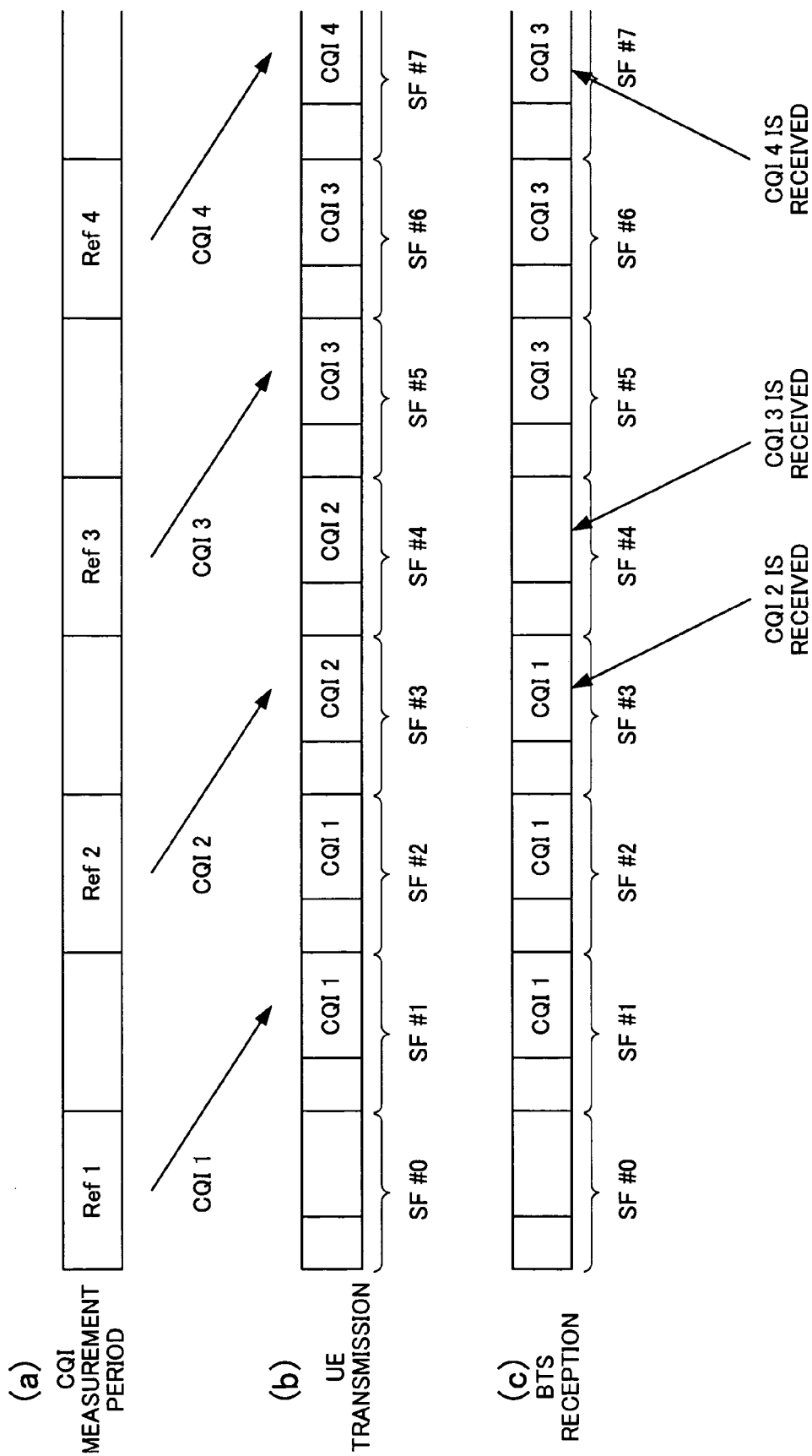
FIG. 11 illustrates transmission and reception timings in a second comparative example in comparison to the embodiment.

FIG. 11 illustrates a second comparative example, where the communication terminal transmits the CQIs that are based on CQI update cycle information with priority ("UE transmission") and the radio base station receives the CQIs that are based on repetition count information with priority ("BTS reception"). In this case, the communication terminal transmits CQI 1 twice in SF #1 and in SF #2 in repetition, and transmits CQI 2 twice in SF #3 and in SF #4 in repetition. The radio base station judges that CQI 1 is transmitted three times in SF #1, SF #2, and SF #3, and combines two CQI 1's and one CQI 2, three times in all, and receives and decodes the result. Consequently, the probability the CQI results in an error increases further.

Figure 12:
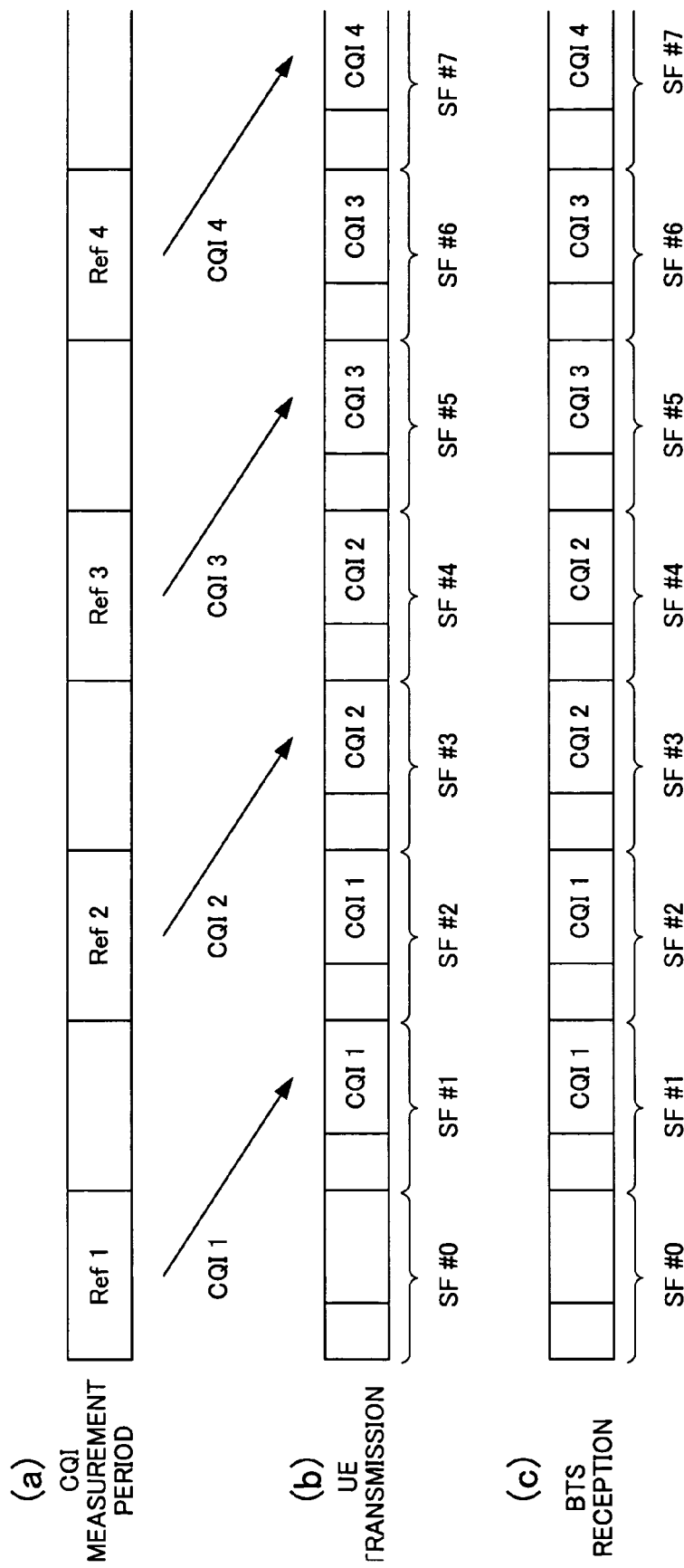
FIG. 12 illustrates transmission and reception timings in a third comparative example in comparison to the embodiment.

FIG. 12 illustrates a third comparative example, where the communication terminal and the radio base station both transmit (UE transmission) and receives (BTS reception) the CQIs that are based on CQI update cycle information with priority. In this case, the communication terminal transmits CQI 1 twice in sub-frame (SF) #1 and in SF #2 in repetition and transmits CQI 2 in SF #3 and in SF #4 in repetition. Although the communication terminal combines CQI 1's three times and transmits the result with enough transmission power to enable reception and decoding, the radio base station combines CQI 2's twice in SF #3 and SF #4 and receives and decodes the result. Consequently, the both CQIs have insufficient received power and the probability CQI results in an error increases.

In the above comparative examples, it is obvious that the CQI does not have sufficient received power and that the probability the CQI results in an error increases.

Thus, according to the present embodiment, when the CQI signals are transmitted and received based on predetermined CQI update cycle information and CQI repetition count information, the CQI repetition count is given priority in CQI transmission and reception processing. As a result, the present embodiment makes possible communication terminal 100 and radio base station 200 that can prevent deterioration in CQI error rate characteristics.

EMBODIMENT 2

In this embodiment, when the communication terminal detects that a transmission timing of a CQI that is based on CQI update cycle information and a transmission timing of a CQI that is based on CQI repetition count information overlap, or when the radio base station detects that a transmission timing of a CQI that is based on CQI update cycle information and a transmission timing of a CQI that is based on CQI repetition count information overlap, the communication terminal or the radio base station transmits a detection signal (hereinafter "error signal") indicating the overlap to higher apparatus. Upon receiving the error signal, higher apparatus reconfigures the CQI update cycle information and CQI repetition count information anew such that transmission timings and reception timings do not overlap, and reports the reconfigured information to both the communication terminal and the radio base station.

Figure 13:
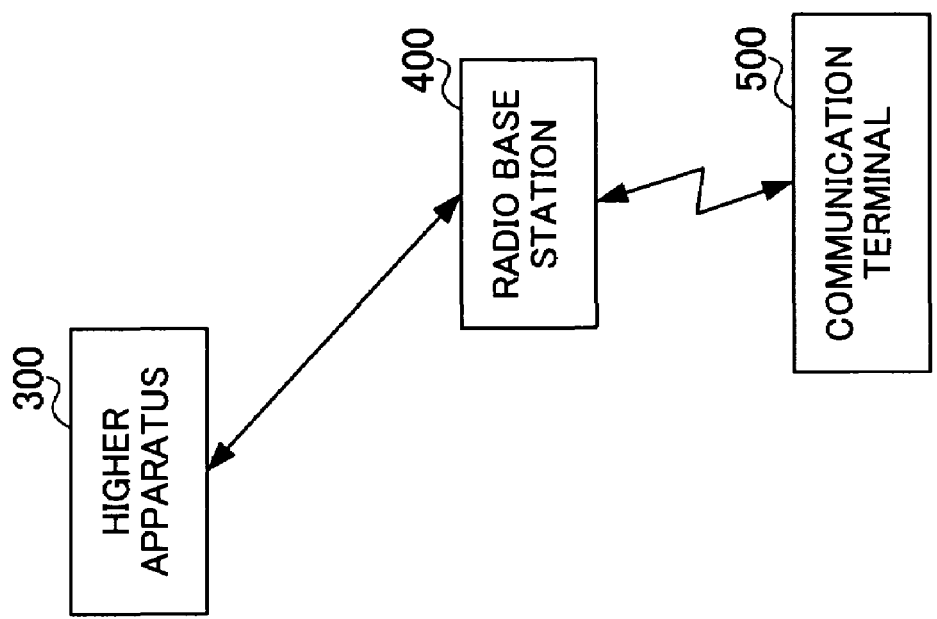
FIG. 13 is a block diagram showing a radio communication system according to Embodiments 2 and 3.

As shown in FIG. 13, higher apparatus 300 and radio base station 400 are connected by wire, and radio base station 400 and communication terminal 500 are connected by radio.

Higher apparatus 300 manages radio resource management in radio base station 400 and controls radio base station 400, including, for example, handover control. Higher apparatus 300 is able to transmit information to communication terminal 500 via radio base station 400.

Figure 14:
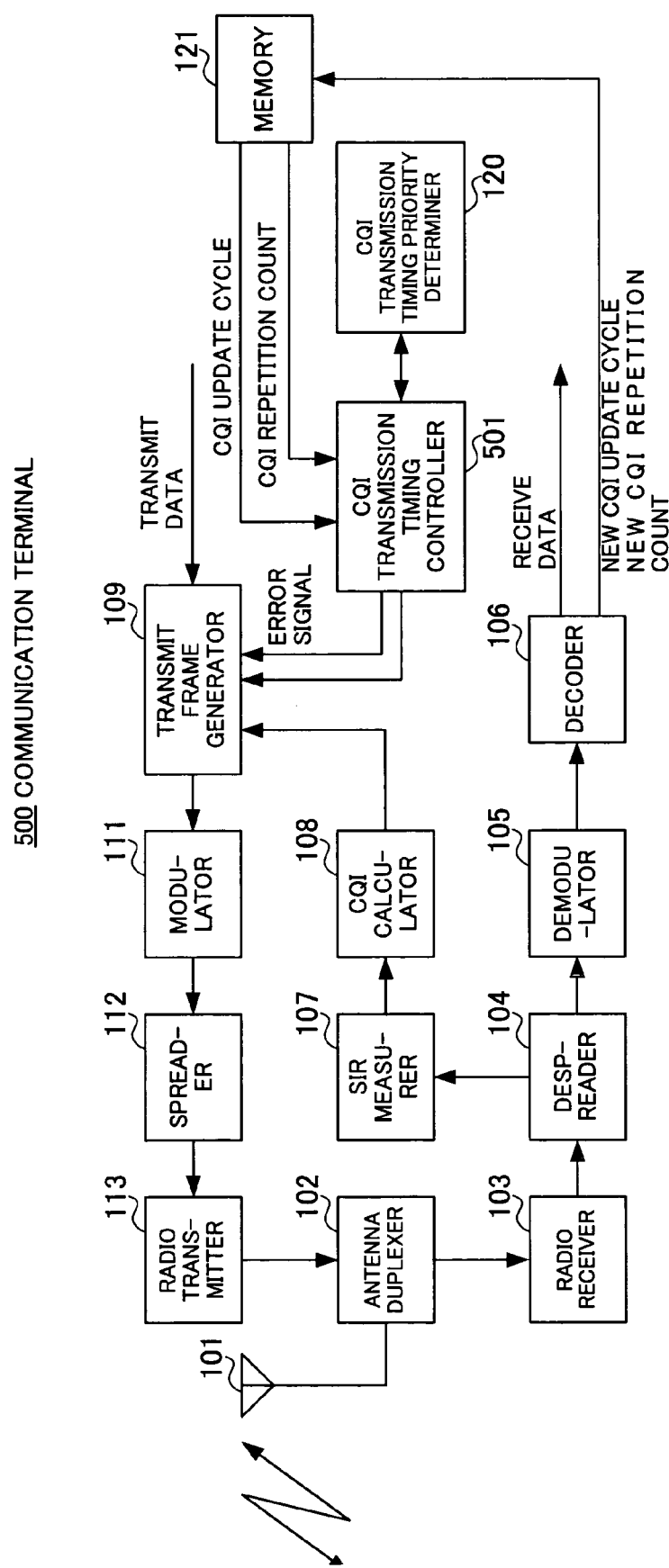
FIG. 14 is a block diagram showing a configuration of a communication terminal according to Embodiment 2.

FIG. 14 shows the configuration of communication terminal 500 according to the present embodiment. Parts in FIG. 14 that are identical to ones in FIG. 6 are assigned the same reference numerals without further explanations. Like CQI transmission timing controller 110 in Embodiment 1, when a transmission timing of a CQI that is based on the CQI update cycle information stored in memory 121 and a transmission timing of a CQI that is based on the CQI repetition count information stored in memory 121 overlap, CQI transmission timing controller 501 reports the overlap of transmission timings to CQI transmission timing priority determiner 120. Upon receiving information indicating the overlap of transmission timings, CQI transmission timing priority determiner 120 gives a command to transmit the CQI based on repetition with priority, to CQI transmission timing controller 501. CQI transmission timing controller 501 follows the command from CQI transmission timing priority determiner 120 and gives the timing to transmit the CQI and a command to transmit the CQI based on repetition with priority, to transmit frame generator 109.

In addition, CQI transmission timing controller 501 of this embodiment produces an error signal upon detecting that a transmission timing of the CQI based on the CQI update cycle information and a transmission timing of the CQI that is based on the repetition count information overlap, and sends this error signal to transmit frame generator 109. Transmit frame generator 109 inserts the error signal in a transmit frame. The error signal includes the CQI update cycle information and CQI repetition count information that are then stored in memory 121, and is transmitted to higher apparatus 300 via radio base station 400.

Upon receiving the error signal from communication terminal 500, higher apparatus 300 configures new CQI update cycle information and CQI repetition count information such that a transmission timing of a CQI that is based on the CQI update cycle information and a transmission timing of a CQI that is based on the CQI repetition count information do not overlap, and transmits the new CQI update cycle information and CQI repetition count information to communication terminal 500 via radio base station 400.

Communication terminal 500 receives the new CQI update cycle information and CQI repetition count information and stores them in memory 121. Thereafter, the CQIs are transmitted using these new CQI update cycle information and CQI repetition count information. By this means, when later the CQIs are transmitted, a transmission timing of a CQI that is based on the CQI update cycle information and a transmission timing of a CQI that is based on the CQI repetition count information do not overlap.

Figure 15:
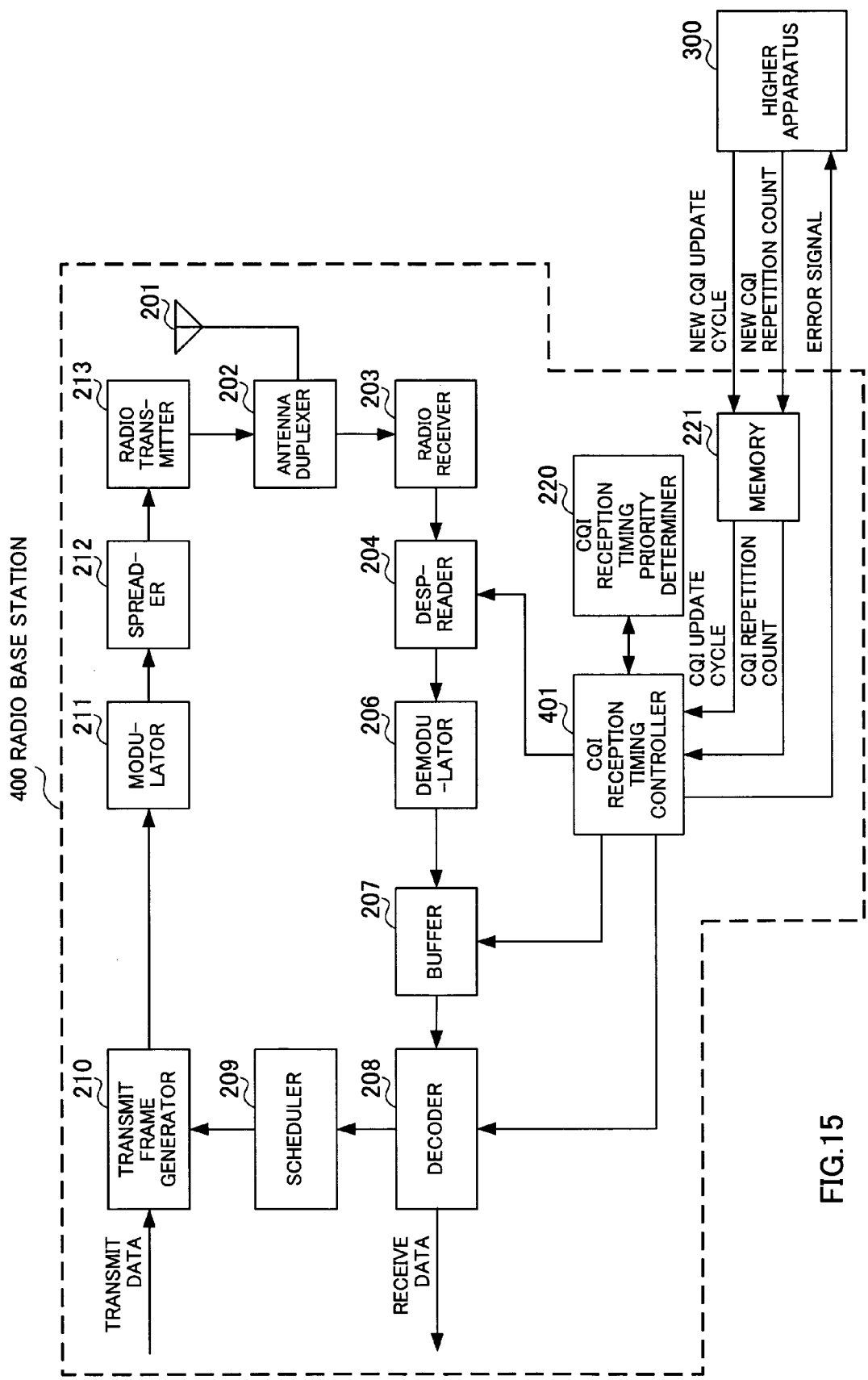
FIG. 15 is a block diagram showing a configuration of a radio base station according to Embodiment 2.

FIG. 15 shows the configuration of radio base station 400 according to the present embodiment. Parts in FIG. 15 that are identical to ones in FIG. 7 are assigned the same reference numerals without further explanations. Similar to CQI reception timing controller 205 in Embodiment 1, when a reception timing of a CQI that is based on the CQI update cycle information stored in memory 221 and a reception timing of a CQI that is based on the CQI repetition count information stored in memory 221 overlap, CQI reception timing controller 401 reports this overlap of reception timing to CQI reception timing priority determiner 220. Upon receiving information indicating the overlap of reception timings, CQI reception timing priority determiner 220 gives a command to receive the CQI based on repetition with priority, to CQI reception timing controller 401. In accordance with the command from CQI reception timing priority determiner 220, CQI reception timing controller 401 determines the timing to receive the CQI and sends the result to despreader 204. In addition, in accordance with the command from CQI reception timing priority determiner 220, CQI reception timing controller 401 determines the number of times the CQI is combined, and sends this combining count to buffer 207 and decoder 208.

In addition, CQI reception timing controller 401 produces an error signal (which includes the CQI update cycle information and CQI repetition count information) upon detecting that a transmission timing of the CQI that is based on the CQI update cycle information and a transmission timing of the CQI that is based on the repetition count information overlap, and sends this error signal to higher apparatus 300.

Upon receiving the error signal from radio base station 400, higher apparatus 300 configures new CQI update cycle information and CQI repetition count information, and sends the new CQI update cycle information and CQI repetition count information to radio base station 400.

Radio base station 400 receives the new CQI update cycle information and CQI repetition count information and stores them in memory 221. Thereafter, the CQIs are received and demodulated using these new CQI update cycle information and CQI repetition count information. By this means, when later the CQIs are received, a reception timing of a CQI that is based on the CQI update cycle information and a reception timing of a CQI that is based on the CQI repetition count information do not overlap.

Thus, in the communication system of the present embodiment including higher apparatus 300, radio base station 400, and communication terminal 500, when a transmission or reception timing of a CQI that is based on CQI update cycle information and a transmission or reception timing of a CQI that is based on CQI repetition count information overlap in communication terminal 500 or in radio base station 400, this is reported to higher apparatus 300.

Upon receiving the report, higher apparatus 300 reconfigures the CQI update cycle information and CQI repetition count information, and sends the new configuration information to communication terminal 500 and radio base station 400. For ease of explanation, a case has been described above where, when communication terminal 500 produces an error signal, communication terminal 500 alone receives the new configuration information, and, when radio base station 400 produces an error signal, radio base station 400 alone receives the new configuration information. However, the new configuration information is sent to both communication terminal 500 and radio base station 400 so that memory 121 and memory 221 hold the same information. In other words, when either communication terminal 500 or radio base station 400 produces an error signal, the new configuration information, which is configured in higher apparatus 300, is sent to both communication terminal 500 and radio base station 400. Later, communication terminal 500 and radio base station 400 perform transmission and reception using the new configuration information.

This allows communication terminal 500 and radio base station 400 to perform CQI transmission processing and reception processing using the same new CQI update cycle information and CQI repetition count information, so that radio base station 400 is able to adequately combine the CQIs transmitted from communication terminal 500.

According to the present embodiment, when higher apparatus 300 reconfigures the CQI update cycle information and CQI repetition count information, higher apparatus 300 reconfigures only the CQI update cycle information and does not change the CQI repetition count information. By this means, when the CQI is transmitted from communication terminal 500 to radio base station 400 using the new CQI update cycle information and the new CQI repetition count information, the probability the CQI results in an error decreases.

As to the method of the reconfiguration, it is possible to maintain the CQI update cycle information as it is and decrease the CQI repetition count information. However, decreasing the CQI repetition count information has the risk of increasing the probability that the CQI results in an error such as mentioned above. Taking this into consideration, the present embodiment is designed to change the CQI update cycle information alone. For example, upon receiving from communication terminal 500 an error signal and information representing that feedback cycle k is 2 and repetition is 3, higher apparatus 300 reconfigures CQI feedback cycle k at 3 and repetition at 3, and reports new information representing that CQI feedback cycle k is 3 and repetition is 3, to both communication terminal 500 and radio base station 400.

According to the present embodiment, when communication terminal 500 detects that a transmission timing of a CQI that is based on CQI update cycle information and a transmission timing of a CQI that is based on repetition count information overlap, or when radio base station 400 detects that a reception timing of a CQI based on CQI update cycle information and a reception timing of a CQI based upon CQI repetition count information overlap, the CQI update cycle information and CQI repetition count information are reconfigured, so that communication terminal 500 and radio base station 400 use the new CQI update cycle information and CQI repetition count information and perform CQI transmission processing and CQI reception processing such that there transmission timings and reception timings of the CQIs do not overlap.

As to the reconfiguration, the CQI repetition count information is kept unchanged and the CQI update cycle information alone is changed, thereby making the probability less that, when the CQI signal is transmitted from communication terminal 500 to radio base station 400 using the new CQI update cycle information and the new CQI repetition count information, the CQI results in an error.

Now, although a case has been described above with the present embodiment where the CQI is reconfigured in higher apparatus 300, the present invention is by no means limited to this, and it is equally possible to reconfigure the CQI in radio base station 400. In that case, radio base station 400 performs the reconfiguration upon receiving an error signal from communication terminal 500, sends the new configuration information to communication terminal 500 and higher apparatus 300, and stores the same information in memory 221 in radio base station 400.

In addition, although a case has been described above with the present embodiment where an error signal is transmitted including the CQI update cycle information (i.e. CQI feedback cycle k) and CQI repetition count information (i.e. repetition), the present invention is by no means limited to this, and it is equally possible to send only information that represents a timing overlap.

Moreover, although a case has been described above with the present embodiment where the CQI update cycle information alone is changed, the present invention is by no means limited to this, and it is equally possible to reconfigure both the CQI update cycle information and CQI repetition count information. This applies to following Embodiment 3 as well.

Moreover, although a case has been described above with the present embodiment where CQI transmission timing priority determiner 120 is provided as in Embodiment 1 and a CQI that is based on the CQI repetition count information is transmitted with priority over a CQI that is based on the CQI update cycle information, the present invention is by no means limited to this, and transmission timings of the CQIs do not overlap when the new, reconfigure CQI update cycle information and CQI repetition count information are used, so that CQI transmission timing priority determiner 120 may not be necessary. In a similar fashion, although a case has been described above with the present embodiment where CQI reception timing priority determiner 220 is provided, and a CQI that is based on the CQI repetition count information is transmitted with priority over a CQI that is based on the CQI update cycle information, the present invention is by no means limited to this, and reception timings of the CQIs do not overlap when the new, reconfigured CQI update cycle information and CQI repetition count information are used, so that CQI reception timing priority determiner 220 may not be necessary. This applies to following Embodiment 3 as well.

EMBODIMENT 3

In this embodiment, when the communication terminal detects that a transmission timing of a CQI that is based on CQI update cycle information and a transmission timing of a CQI that is based on CQI repetition count information overlap, the CQI update cycle information and CQI repetition count information are reconfigured such that transmission timings of the CQIs do not overlap. In addition, in this embodiment, when the radio base station detects that a reception timing of a CQI that is based on CQI update cycle information and a reception timing of a CQI that is based on CQI repetition count information overlap, the CQI update cycle information and CQI repetition count information are reconfigured such that reception timings of the CQIs do not overlap. The communication terminal or radio base station then reports the new, reconfigured information to higher apparatus. Upon receiving the new, reconfigured information from one of the communication terminal and the radio base station, higher apparatus reports the new reconfigured information to the other one of the communication terminal and the radio base station so that the communication terminal and the radio base station have the same configuration.

Figure 16:
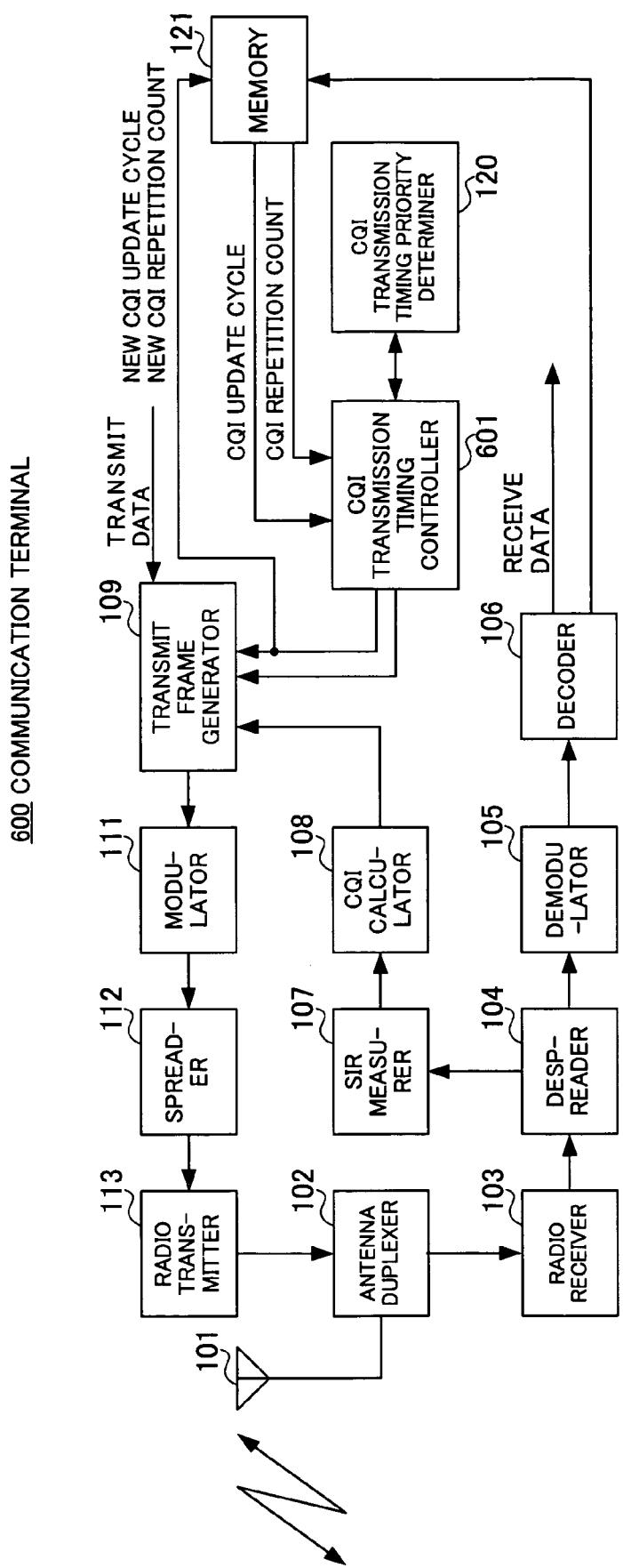
FIG. 16 is a block diagram showing a configuration of communication terminal according to Embodiment 3.

FIG. 16 shows the configuration of communication terminal 600 according to the present embodiment. Parts in FIG. 16 that are identical to ones in FIG. 6 are assigned the same reference numerals without further explanations. Like CQI transmission timing controller 110 in Embodiment 1, when a transmission timing of a CQI that is based on the CQI update cycle information stored in memory 121 and a transmission timing of a CQI that is based on the CQI repetition count information stored in memory 121 overlap, CQI transmission timing controller 601 reports the overlap of transmission timings to CQI transmission timing priority determiner 120. Upon receiving information indicating the overlap of transmission timings, CQI transmission timing priority determiner 120 gives a command to transmit the CQI based on repetition with priority, to CQI transmission timing controller 601. CQI transmission timing controller 601 follows the command from CQI transmission timing priority determiner 120 and gives the timing to transmit the CQI and a command to transmit the CQI based on repetition with priority, to transmit frame generator 109.

In addition, when CQI transmission timing controller 601 of this embodiment detects that a transmission timing of the CQI based on the CQI update cycle information and a transmission timing of the CQI that is based on the repetition count information overlap, CQI transmission timing controller 601 configures new CQI update cycle information and CQI repetition count information such that a transmission timing of the CQI based on the CQI update cycle information and a transmission timing of the CQI based on the CQI repetition count information do not overlap, stores the new CQI update cycle information and CQI repetition count information in memory 121, and sends these new information to transmit frame generator 109.

Transmit frame generator 109 inserts the new CQI update cycle information and CQI repetition count information in a transmit frame. The new CQI update cycle information and CQI repetition count information are then sent to higher apparatus.

Figure 17:
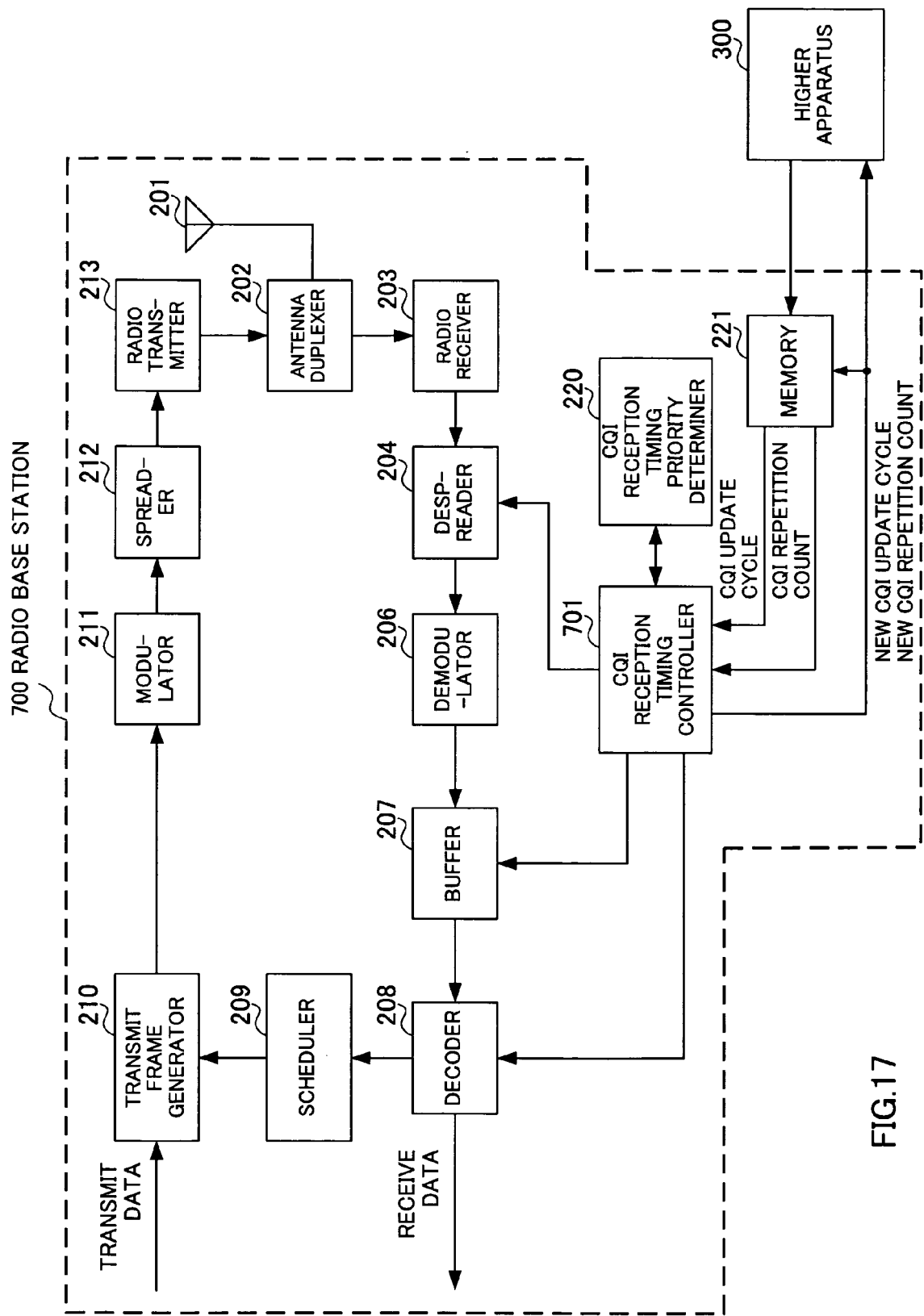
FIG. 17 is a block diagram showing a configuration of a radio base station according to Embodiment 3.

FIG. 17 shows the configuration of radio base station 700 according to the present embodiment. Parts in FIG. 17 that are identical to ones in FIG. 7 are assigned the same reference numerals without further explanations. Similar to CQI reception timing controller 205 in Embodiment 1, when a reception timing of a CQI that is based on the CQI update cycle information stored in memory 221 and a reception timing of a CQI that is based on the CQI repetition count information stored in memory 221 overlap, CQI reception timing controller 701 reports this overlap of reception timing to CQI reception timing priority determiner 220. Upon receiving information indicating the overlap of reception timings, CQI reception timing priority determiner 220 gives a command to receive the CQI based on repetition with priority, to CQI reception timing controller 701. In accordance with the command from CQI reception timing priority determiner 220, CQI reception timing controller 701 determines the timing to receive the CQI and sends the result to despreader 204. In addition, in accordance with the command from CQI reception timing priority determiner 220, CQI reception timing controller 701 determines the number of times the CQI is combined, and sends this combining count to buffer 207 and decoder 208.

In addition, when CQI reception timing controller 701 of this embodiment detects that a reception timing of the CQI based on the CQI update cycle information and a reception timing of the CQI that is based on the repetition count information overlap, CQI reception timing controller 701 configures new CQI update cycle information and CQI repetition count information such that a reception timing of the CQI based on the CQI update cycle information and a reception timing of the CQI based on the CQI repetition count information do not overlap, stores the new CQI update cycle information and CQI repetition count information in memory 221, and reports these new information to higher apparatus 300.

Upon receiving the new configuration from communication terminal 600 or radio base station 700, higher apparatus 300 produces a command such that communication terminal 600 and radio base station 700 have the same configuration. For example, when higher apparatus 300 receives the new configuration information from communication terminal 600, higher apparatus 300 reports the same new configuration information to radio base station 700. By this means, communication terminal 600 and radio base station 700 reliably avoid using different CQI update cycle information and CQI repetition count information, thereby allowing radio base station 700 to reliably combine the same CQIs.

Incidentally, similar to Embodiment 2, in the present embodiment, the CQI repetition count information is kept unchanged and the CQI update cycle information alone is changed upon the reconfiguration. By this means, when the CQI signal is sent from communication terminal 600 and radio base station 700 using the new CQI update cycle information and the new CQI repetition count information, the probability the CQI results in an error can be decreased.

OTHER EMBODIMENTS

Although cases have been described above with Embodiments 1-3 where the communication terminal transmits the CQI and the radio base station receives the CQI, the present invention is by no means limited to this, and it is equally possible to have the radio base station transmit the CQI and have the communication terminal receive the CQI, and the present invention would be applicable to a wide range of cases where transmission and reception of the CQI is performed using CQI update cycle information and CQI repetition count information. That is, although cases have been described above with Embodiments 1-3 where a radio transmission apparatus and a radio reception apparatus according to the present invention are adopted in the communication terminal and in the radio base station, respectively, the present invention is by no means limited to this, and it is equally possible to adopt the radio transmission apparatus of the present invention to the radio base station and the radio reception apparatus to the communication terminal.

In addition, although a case has been described above with Embodiment 3 where, when communication terminal 600 performs new set-up, communication terminal 600 reports the new configuration information to higher apparatus 300 and higher apparatus 300 reports the new configuration information to radio base station 700, the present invention is by no means limited to this, and it is equally possible to have communication terminal 600 report new configuration information to radio base station 700 and have radio base station 700 store the new configuration information in memory 221. In that case, radio base station 700 reports the new configuration information to higher apparatus 300. In a similar fashion, although a case has been described above with Embodiment 3 where, when radio base station 700 performs new set-up, radio base station 700 reports the new configuration information to higher apparatus 300 and higher apparatus 300 reports the new configuration information to communication terminal 600, the present invention is by no means limited to this, and it is equally possible to have radio base station 700 report the new configuration information directly to communication terminal 600. In that case, radio base station 700 reports the new configuration information to higher apparatus 300.

Moreover, although cases have been described above with Embodiments 1-3 where an overlap of a transmission timing of a CQI that is based on CQI update cycle information and a transmission timing of a CQI that is based on CQI repetition count information is detected, the CQI based on the CQI repetition count information is transmitted with priority, the present invention is by no means limited to this, and it is equally possible, when a transmission timing of a CQI that is based on the CQI update cycle information and a transmission timing of a CQI that is based on the CQI repetition count information overlap, to stop transmitting the CQIs. Likewise, when a reception timing of a CQI that is based on the CQI update cycle information and a reception timing of a CQI that is based on the CQI repetition count information overlap, it is possible to stop receiving and decoding the CQIs. By this means, receiving and decoding error CQIs can be avoided.

Although cases have been described above with Embodiments 1-3 where, when a transmission timing of a CQI that is based on CQI update cycle information and a transmission timing of a CQI that is based on CQI repetition count information overlap, the CQI based on the CQI repetition count information is transmitted with priority, the present invention is by no means limited to this, and it is equally possible, when a transmission timing of a CQI that is based on other information than the CQI update cycle information and a transmission timing of a CQI that is based on the CQI repetition count information overlap, to transmit the CQI based on the repetition count information with priority and maintain the same advantages as in the above embodiments.

For example, when an ACK/NACK signal is going to be transmitted, the CQI signal must be transmitted in the same sub-frame. If a transmission timing of this CQI and a transmission timing of a CQI that is based on the repetition count information overlap, the CQI based on the CQI repetition count information is transmitted with priority. In addition, if a request comes from higher apparatus that the CQI be transmitted at a timing other than a transmission timing of a CQI based on CQI update cycle information, and, if the transmission timing of this CQI and a transmission timing of a CQI that is based on CQI repetition count information overlap, the CQI based on the CQI repetition count information is transmitted with priority.

Furthermore, although cases have been described above with Embodiments 1-3 where the CQI (or information of equivalent concept) is subject to transmission and reception, the present invention is by no means limited to CQI transmission and reception and is applicable to a wide range of cases where information is transmitted and received based on update cycle information and repetition count information.

Further yet, although cases have been described above with Embodiments 1-3 where packets are transmitted using HSDPA whereby packets for a plurality of communication terminal apparatuses are code-multiplexed in the same time slot, the present invention is by no means limited to this and is applicable to any type of communication where scheduling is performed by multiplexing packets for a plurality of communication terminal apparatuses.

For example, the present invention is applicable to any type of communication where scheduling is performed by code-multiplexing, time-multiplexing, or frequency-multiplexing packets for a plurality of communication terminal apparatuses. When time-multiplexing is used, scheduling is performed across a plurality of time slots in a certain frame unit. When frequency-multiplexing is used, scheduling is performed per frequency in a time slot.

It is noted here that the present invention is by no means limited to the foregoing examples, and changes may be made without departing from the scope and spirit of the present invention in its aspects.

In accordance with one aspect of the present invention, a radio transmission apparatus according to the present invention measures channel quality between the radio transmission apparatus and a communicating party and transmits to the communicating party a CQI that represents a measurement value, and this radio transmission apparatus has: a memory that stores CQI update cycle information representing an update cycle of the CQI and CQI repetition count information representing how many consecutive times the same CQI is transmitted; and a CQI transmitter that, when a transmission timing of a CQI that is based on the CQI update cycle information and a transmission timing of a CQI that is based on the CQI repetition count information overlap, transmits the CQI based on the repetition count information to the communicating party with priority.

According to the above configuration, when a transmission timing of the CQI based on the CQI update cycle information and a transmission timing of the CQI based on the CQI repetition count information overlap, it is clear based on which information the CQI is transmitted. In addition, the CQI based on the CQI repetition count information is transmitted with priority, so that received power of the CQI at the receiving side is secured, and, as a result, deterioration in CQI error rate characteristics at the receiving side is prevented.

In accordance with another aspect of the present invention, when a transmission timing of the CQI based on the CQI update cycle information and a transmission timing of the CQI based on the CQI repetition count information overlap, the radio transmission apparatus according to the present invention reports to a higher apparatus that the CQI update cycle information and CQI repetition count information in use have an error, receives reconfigured CQI update cycle information and CQI repetition count information from the higher apparatus and stores these information in the memory, and, in this radio transmission apparatus, the CQI transmitter transmits the CQI to the communicating party based on the reconfigured CQI update cycle information and CQI repetition count information.

According to the above configuration, the CQI is transmitted using the CQI update cycle information and CQI repetition count information that are reconfigured in the higher apparatus, a transmission timing of the CQI based on the CQI update cycle information and a transmission timing of the CQI based on the CQI repetition count information do not overlap, and, as a result, the CQI is reliably transmitted to the communicating party. In addition, the CQI update cycle information and CQI repetition count are reconfigured in the higher apparatus, so that the same information can be reported to and configured in the communicating party and the CQI can be transmitted and received with the communicating party using the same reconfigured information. As a result, the communicating party is able to reliably combine the same CQIs and decode the CQI without an error.

In accordance with another aspect of the present invention, when a transmission timing of the CQI based on the CQI update cycle information and a transmission timing of the CQI based on the CQI repetition count information overlap, the radio transmission apparatus according to the present invention reports to the communicating party that the CQI update cycle information and CQI repetition count information in use have an error, receives reconfigured CQI update cycle information and CQI repetition count information from the communicating party and stores these information in the memory, and, in this radio transmission apparatus, the CQI transmitter transmits the CQI to the communicating party based on the reconfigured CQI update cycle information and CQI repetition count information.

According to the above configuration, the CQI is transmitted using the CQI update cycle information and CQI repetition count information that are reconfigured by the communicating party, a transmission timing of the CQI based on the CQI update cycle information and a transmission timing of the CQI based on the CQI repetition count information do not overlap, and, as a result, the CQI is reliably transmitted to the communicating party. In addition, the CQI update cycle information and CQI repetition count are reconfigured by the communicating party, so that the CQI can be transmitted and received between the radio transmission apparatus and the communicating party using the same reconfigured information. As a result, the communicating party is able to reliably combine the same CQIs and decode the CQI without an error.

In accordance with another aspect of the present invention, when a transmission timing of the CQI based on the CQI update cycle information and a transmission timing of the CQI based on the CQI repetition count information overlap, the radio transmission apparatus according to the present invention reconfigures the CQI update cycle information and CQI repetition count information such that the transmission timings do not overlap and stores these information in a memory and reports the reconfigured CQI update cycle information and CQI repetition count information to the communicating party, and, in this radio transmission apparatus, the CQI transmitter transmits the CQI based on these CQI update cycle information and CQI repetition count information.

According to the above configuration, the CQI is transmitted using the reconfigured CQI update cycle information and CQI repetition count information, so that a transmission timing of the CQI based on the CQI update cycle information and a transmission timing of the CQI based on the CQI repetition count information do not overlap, and, as a result, the CQI is reliably transmitted to the communicating party. In addition, the reconfigured CQI update cycle information and CQI repetition count information are reported to the communicating party, so that the CQI can be transmitted and received between the radio transmission apparatus and the communicating party using the same reconfigured information. As a result, the communicating party is able to reliably combine the same CQIs and decode the CQI without an error.

In accordance with another aspect of the present invention, in the radio transmission apparatus according to the present invention, of the CQI update cycle information and the CQI repetition count information, the CQI update cycle information alone is reconfigured.

According to the above configuration, in order not to make a transmission timing of the CQI that is based on the CQI update cycle information and a transmission timing of the CQI that is based on the CQI repetition count information overlap, in practice, it is possible to make the CQI update cycle information longer or decrease the CQI repetition count information. According to this example, however, the CQI update cycle information alone is reconfigured without changing the CQI repetition count information, thereby securing the combined gain of the CQI upon decoding and preventing deterioration in CQI error rate characteristics upon reconfiguration.

In accordance with yet another aspect of the present invention, a radio reception apparatus according to the present invention receives a CQI representing channel quality between the radio reception apparatus and a communicating party and decodes the CQI, and this radio reception apparatus has: a memory that stores CQI update cycle information representing an update cycle of the CQI and CQI repetition count information representing how many consecutive times the same CQI is transmitted; and a CQI receiver and decoder that, when a reception timing of a CQI that is based on the CQI update cycle information and a transmission timing of a CQI that is based on the CQI repetition count information overlap, receives and decodes the CQI based on the CQI repetition count information with priority.

According to the above configuration, when a reception timing of the CQI based on the CQI update cycle information and a reception timing of the CQI based on the CQI repetition count information overlap, it is clear based on which information the CQI is received. In addition, the CQI based on the CQI repetition count information is received and decoded with priority, so that the received power of the CQI is secured and deterioration in CQI error rate characteristics is prevented.

In accordance with yet another aspect of the present invention, when a reception timing of the CQI based on the CQI update cycle information and a reception timing of the CQI based on the CQI repetition count information overlap, the radio reception apparatus according to the present invention reports to a higher apparatus that the CQI update cycle information and CQI repetition count information in use have an error, receives reconfigured CQI update cycle information and CQI repetition count information from the higher apparatus and stores these information in the memory, and, in this radio transmission apparatus, the CQI receiver and decoder receives the reconfigured CQI update cycle information and CQI repetition count information and thereafter receives and decodes the CQI based on these CQI update cycle information and CQI repetition count information.

According to the above configuration, the CQI is received and decoded using the CQI update cycle information and CQI repetition count information that are reconfigured in the higher apparatus, so that a reception timing of the CQI based on the CQI update cycle information and a reception timing of the CQI based on the CQI repetition count information do not overlap, and, as a result, the same CQIs are reliably combined upon decoding and deterioration in CQI error rate characteristics is prevented.

In accordance with yet another aspect of the present invention, when a reception timing of the CQI based on the CQI update cycle information and a reception timing of the CQI based on the CQI repetition count information overlap, the radio reception apparatus according to the present invention reconfigures the CQI update cycle information and CQI repetition count information anew such that the reception timings do not overlap, stores the reconfigured CQI update cycle information and CQI repetition count information in the memory, and reports these new information to the communicating party, and, in this radio reception apparatus, the CQI receiver and decoder receives and decodes the CQI based on the reconfigured CQI update cycle information and CQI repetition count information.

According to the above configuration, the CQI is received and decoded using the reconfigured CQI update cycle information and CQI repetition count information, so that a reception timing of the CQI based on the CQI update cycle information and a reception timing of the CQI based on CQI repetition count information do not overlap. As a result, the same CQIs are reliably combined upon decoding and deterioration in CQI error rate characteristics is prevented. In addition, the reconfigured CQI update cycle information and CQI repetition count information are reported to the communicating party, so that the CQI can be transmitted and received between the radio reception apparatus and the communicating party using the same reconfigured information. As a result, the same CQIs are reliably combined and the CQI is decoded without an error.

In accordance with yet another aspect of the present invention, in the radio reception apparatus according to the present invention, of the CQI update cycle information and the CQI repetition count information, the CQI update cycle information alone is reconfigured.

According to the above configuration, in order not to make a reception timing of the CQI that is based on the CQI update cycle information and a reception timing of the CQI that is based on the CQI repetition count information overlap, in practice, it is possible to make the CQI update cycle information longer or decrease the CQI repetition count information. According to this example, however, the CQI update cycle information alone is reconfigured without changing the CQI repetition count information, thereby securing the combined gain of the CQI upon decoding and preventing deterioration in CQI error rate characteristics upon reconfiguration.

In accordance with yet another aspect of the present invention, a radio communication system according to the present invention has a communication terminal apparatus that transmits a CQI based on predetermined CQI update cycle information and CQI repetition count information, and a radio base station apparatus that receives and decodes the CQI based on the predetermined CQI update cycle information and CQI repetition count information, and, in this radio communication system, the communication terminal apparatus transmits the CQI that is based on the CQI repetition count information with priority and the radio base station apparatus receives and decodes the CQI based on the CQI repetition count information with priority.

According to the above configuration, when a transmission timing of the CQI based on the CQI update cycle information and a transmission timing of the CQI based on the CQI repetition count information overlap in the communication terminal apparatus, or when a reception timing of the CQI based on the CQI update cycle information and a reception timing of the CQI based on the CQI repletion count information overlap in the radio base station apparatus, the radio base station apparatus adequately combines the same CQIs transmitted in repetition from the communication terminal apparatus and decodes the result. In addition, the CQI based on the CQI repetition count information is transmitted and received with priority so that the combined gain of the CQI is secured.

In accordance with yet another aspect of the present invention, the radio communication system according to the present invention further has a higher apparatus that controls a plurality of radio base station apparatuses, and, in this radio communication system, when a transmission timing of the CQI that is based on the CQI update cycle information and a transmission timing of the CQI that is based on the CQI repetition count information overlap, or when a reception timing of the CQI based on the CQI update cycle information and a reception timing of the CQI based on the CQI repetition count information overlap, the upper apparatus receives information indicating the overlap from the communication terminal apparatus or the radio base station apparatus and reports back new CQI update cycle information and CQI repetition count information to the communication terminal apparatus or the radio base station apparatus.

According to the above configuration, the CQI update cycle information and CQI repetition count information are reconfigured in the higher apparatus, so that the same, reconfigured information is set in the communication terminal apparatus and the radio base station apparatus and the communication terminal apparatus and the radio base station apparatus are able to transmit and receive the CQI using the same, reconfigured information. As a result, the radio base station is able to reliably combine the same CQIs and decoded the CQI without error.

Thus, according to the present invention described above, when CQI update cycle information and CQI repetition count information are configured such that a transmission or reception timing of a CQI that is based on the CQI update cycle information and a transmission or reception timing of a CQI that is based on the CQI repetition count information overlap, deterioration in CQI error rate characteristics can be prevented.

The present application is based on Japanese Patent Application No.2003-284512, filed Jul. 31, 2003, entire content of which is expressly incorporated herein by reference.

INDUSTRIAL APPLICABILITY

The present invention is suitable for use in radio communication terminals such as mobile telephones and base station apparatuses and the equivalent.

The invention claimed is:

1. A radio transmission apparatus that measures channel quality between the radio transmission apparatus and a communicating party and transmits to the communicating party a CQI (Channel Quality Indicator) representing a measurement value, the apparatus comprising:
   a memory that stores CQI update cycle information representing an update cycle of the CQI and CQI repetition count information representing how many consecutive times the same CQI is transmitted;
   a CQI transmission timing controller that determines a transmission timing of the CQI based on the CQI update cycle information stored in the memory and a transmission timing of the CQI based on the CQI repetition count information stored in the memory, and, when the transmission timing of the CQI based on the CQI update cycle information and the transmission timing of the CQI based on the CQI repetition count information overlap, commands to transmit the CQI at the transmission timing based on the CQI repetition count information, to the communicating party with priority; and
   a CQI transmitter that transmits the CQI at the transmission timings determined by the CQI transmission timing controller, according to the command.

2. The radio transmission apparatus of claim 1, wherein:
   when the transmission timing of the CQI based on the CQI update cycle information and the transmission timing of the CQI based on the CQI repetition count information overlap, the radio transmission apparatus reports to a higher apparatus that the CQI update cycle information and CQI repetition count information in use have an error, receives reconfigured CQI update cycle information and CQI repetition count information from the higher apparatus and stores these information in the memory; and
   the CQI transmission timing controller determines a transmission timing of the CQI based on the reconfigured CQI update cycle information stored in the memory and a transmission timing of the CQI based on the reconfigured CQI repetition count information stored in the memory.

3. The radio transmission apparatus of claim 2, wherein, of the CQI update cycle information and the CQI repetition count information, the CQI update cycle information alone is reconfigured.

4. The radio transmission apparatus of claim 1, wherein:
when the transmission timing of the CQI based on the CQI update cycle information and the transmission timing of the CQI based on the CQI repetition count information overlap, the radio transmission apparatus reports to the communicating party that the CQI update cycle information and CQI repetition count information in use have an error, receives reconfigured CQI update cycle information and CQI repetition count information from the communicating party and stores these information in the memory; and the CQI transmission timing controller determines a transmission timing of the CQI based on the reconfigured CQI update cycle information stored in the memory and a transmission timing of the CQI based on the reconfigured CQI repetition count information stored in the memory.

5. The radio transmission apparatus of claim 4, wherein, of the CQI update cycle information and the CQI repetition count information, the CQI update cycle information alone is reconfigured.

6. The radio transmission apparatus of claim 1, wherein:
when the transmission timing of the CQI based on the CQI update cycle information and the transmission timing of the CQI based on the CQI repetition count information overlap, the radio transmission apparatus reconfigures the CQI update cycle intonation and CQI repetition count intonation anew such that the transmission timings do not overlap, stores the reconfigured CQI update cycle intonation and CQI repetition count information in the memory, and reports these new information to the communicating party; and the CQI transmission timing controller determines a transmission timing of the CQI based on the reconfigured CQI update cycle information stored in the memory and a transmission timing of the CQI based on the reconfigured CQI repetition count information stored in the memory.

7. The radio transmission apparatus of claim 6, wherein, of the CQI update cycle information and the CQI repetition count information, the CQI update cycle information alone is reconfigured.

8. A radio reception apparatus that receives a CQI (Channel Quality Indicator) representing channel quality between the radio reception apparatus and a communicating party and decodes the CQI, the apparatus comprising:

a memory that stores CQI update cycle information representing an update cycle of the CQI and CQI repetition count information representing how many consecutive times the same CQI is received and decoded; and a CQI reception timing controller that determines a reception timing of the CQI based on the CCI update cycle information stored in the memory and a reception timing of the CCI based on the CQI repetition count information stored in the memory, and when the reception timing of the CQI based on the CQI update cycle information and the reception timing of the CQI based on the CQI repetition count information overlap, commands to receive and decode the CQI at the reception timing based on the CQI repetition count information with priority; and a CQI receiver and decoder that receives and decodes the CQI at the reception timings determined by the CQI reception timing controller, according to the command.

9. The radio reception apparatus of claim 8, wherein:
when the reception timing of the CQI based on the CQI update cycle information and the reception timing of the CQI based on the CQI repetition count information overlap, the radio reception apparatus reports to a higher apparatus that the CQI update cycle information and CQI repetition count information in use have an error, receives reconfigured CQI update cycle information and CQI repetition count information from the higher apparatus and stores these information in the memory; and the CQI reception timing controller determines a reception timing of the CQI based on the reconfigured CQI update cycle information stored in the memory and a reception timing of the CQI based on the reconfigured CQI repetition count information stored in the memory.

10. The radio reception apparatus of claim 9, wherein, of the CQI update cycle information and the CQI repetition count information, the CQI update cycle information alone is reconfigured.

11. The radio reception apparatus of claim 8, wherein:
when the reception timing of the CQI based on the CQI update cycle information and the reception timing of the CQI based on the CQI repetition count information overlap, the radio reception apparatus reconfigures the CQI update cycle information and CQI repetition count information anew such that the reception timings do not overlap, stores the reconfigured CQI update cycle information and CQI repetition count information in the memory, and reports these new information to the communicating party; and the CQI reception timing controller determines a reception timing of the CQI based on the reconfigured CQI update cycle information stored in the memory and a reception timing of the CQI based on the reconfigured CQI repetition count information stored in the memory.

12. The radio reception apparatus of claim 11, wherein, of the CQI update cycle information and the CQI repetition count information, the CQI update cycle information alone is reconfigured.

13. A communication terminal apparatus comprising the radio transmission apparatus of claim 1.

14. A radio base station apparatus comprising the radio reception apparatus of claim 8.

15. A radio communication system comprising a radio base station apparatus and a communication terminal apparatus that measures channel quality between the radio base station apparatus and the communication terminal apparatus and transmits to the radio base station apparatus a CQI representing a measurement value, wherein:

the communication terminal apparatus comprises:
a first memory that stores CQI update cycle information representing an update cycle of the CQI and first CQI repetition count information representing how many consecutive times the sane CQI is transmitted;

a CQI transmission timing controller that determines a transmission timing of the CQI based an the CQI update cycle information stored in the first memory and a transmission timing of the CQI based on the first CQI repetition count information stored in the first memory, and, when the transmission timing of the CQI based on the CQI update cycle information and the transmission timing of the CQI based on the first CQI repetition count information overlap, commands to transmit the CQI at the transmission timing based on the first repetition count information, to a communicating party with priority; and a CQI transmitter that transmits the CQI at the transmission timings determined by the CQI transmission timing controller, according to the command, and the radio base station apparatus comprises:

a second memory that stores the CQI update cycle information and second CQI repetition count information representing how many consecutive times the same CQI is received and decoded;

a CQI reception timing controller that determines a reception timing of the CQI based on the CQI update cycle information stored in the second memory and a reception timing of the CQI based on the second CQI repetition count information stored in the second memory, and, when the reception timing of the CQI based on the CQI update cycle information and the reception timing of the CQI based on the second CQI repetition count information overlap, commands to receive and decode the CQI at the reception timing based on the second repetition count information with priority; and a CQI receiver and decoder that receives and decodes the CQI at the reception timings determined by the CQI reception timing controller, according to the command.

16. The radio communication system of claim 15, further comprising a higher apparatus that controls a plurality of radio base station apparatuses, wherein:

when the transmission timing of the CQI based on the CQI update cycle information and the transmission timing of the CQI based on the first CQI repetition count information overlap, the CQI transmission timing controller reports information representing that the transmission timings of the CQI overlap, to the higher apparatus through the radio base station apparatus;

when the reception timing of the CQI based on the CQI update cycle information and the reception timing of the CQI based on the second CQI repetition count information overlap the CQI reception timing controller reports information representing that the reception timings of the CQI overlap, to the higher apparatus;

when the higher apparatus receives the report of the information representing that the transmission timings of the CQI overlap or the information representing that the reception timings of the CQI overlap, the higher apparatus reports to the communication terminal apparatus the new configured CQI update cycle information and first CQI repetition count information and reports to the radio base station apparatus the new configured CQI update cycle information and second CQI repetition count information;

the first memory stores the new configured CQI update cycle information and first CQI repetition count information reported from the higher apparatus; and the second memory stores the new configured CQI update information and second CQI repetition count information reported from the upper apparatus.

17. A radio transmission method that measures channel quality to a communicating party and transmits to the communicating party a CQI (Channel Quality Indicator) representing a measurement value, the method comprising:

determining a transmission timing of the CQI based on predetermined CQI update cycle information representing an update cycle of the CQI and a transmission timing of the CQI based on predetermined CQI repetition count information representing how many consecutive times the same CQI is received and decoded, and, when the transmission timing of the CQI based on the CQI update cycle information and the transmission timing of the CQI based on the CQI repetition count information overlap, commanding to transmit the CQI at the transmission timing based on the CQI repetition count information with priority; and transmitting the CQI at the determined transmission timings, according to the command.

18. A radio reception method that receives a CQI (Channel Quality Indicator) representing channel quality to a communicating party, from the communicating party and decodes the CQI, the method comprising:

determining a reception timing of the CQI based on predetermined CQI update cycle information representing an update cycle of the CQI and a reception timing of the CQI based on predetermined CQI repetition count information representing how many consecutive times the same CQI is received and decoded, and, when the reception timing of the CQI based on the CQI update cycle information and the reception timing of the CQI based on CQI repetition count information overlap, commanding to receive and decode the CQI at the reception timing based on the CQI repetition count information with priority; and receiving and decoding the CQI at the determined reception timings, according to the command.

* * * * *